(12) United States Patent
Ozaki

(10) Patent No.: US 9,443,187 B2
(45) Date of Patent: Sep. 13, 2016

(54) RFID TAG AND FUSE

(71) Applicant: FUJITSU LIMITED, Kawasaki-shi, Kanagawa (JP)

(72) Inventor: Noritsugu Ozaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 14/228,428

(22) Filed: Mar. 28, 2014

(65) Prior Publication Data

US 2014/0209692 A1 Jul. 31, 2014

Related U.S. Application Data

(63) Continuation of application No. PCT/JP2011/073020, filed on Oct. 5, 2011.

(51) Int. Cl.
*G06K 19/06* (2006.01)
*G06K 19/077* (2006.01)
*G06K 19/07* (2006.01)
*G06K 19/073* (2006.01)

(52) U.S. Cl.
CPC ..... *G06K 19/07771* (2013.01); *G06K 19/0715* (2013.01); *G06K 19/0717* (2013.01); *G06K 19/07345* (2013.01)

(58) Field of Classification Search
USPC ....................................................... 235/492
See application file for complete search history.

(56) References Cited

U.S. PATENT DOCUMENTS 6,617,963 B1 * 9/2003 Watters .................... G01D 5/48
340/10.41

FOREIGN PATENT DOCUMENTS

| JP | 05-233903 A | 9/1993 |
|---|---|---|
| JP | 05-258131 A | 10/1993 |
| JP | 2007-089054 A | 4/2007 |
| JP | 2007-241600 A | 9/2007 |
| JP | 2007-241651 A | 9/2007 |
| JP | 2011-100304 A | 5/2011 |

OTHER PUBLICATIONS

International Search Report dated Jan. 31, 2012 corresponding to International Patent Application No. PCT/JP2011/073020 and English translation thereof.

* cited by examiner

*Primary Examiner* — Rafferty Kelly
(74) *Attorney, Agent, or Firm* — Squire Patton Boggs (US) LLP

(57) ABSTRACT

An RFID tag includes an antenna, a first IC chip connected to the antenna, and a first fuse inserted between the antenna and the first IC chip, or inserted in series with the antenna. In the RFID tag, the first fuse becomes electrically conductive at a first temperature or above, and remains in an electrical conductive state after having become electrically conductive.

10 Claims, 28 Drawing Sheets

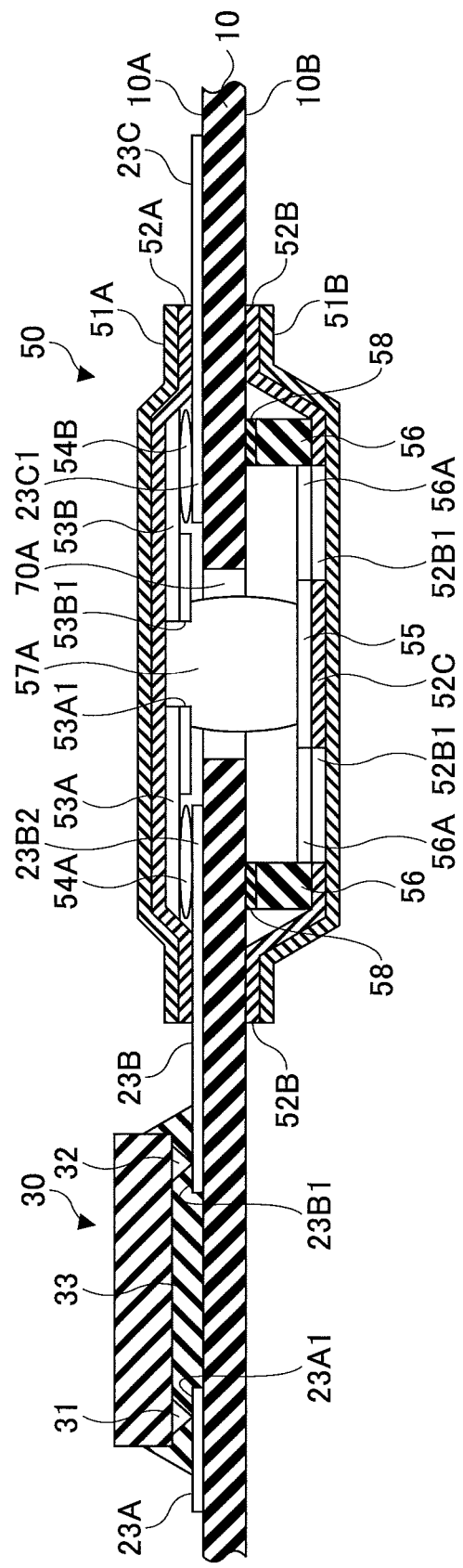

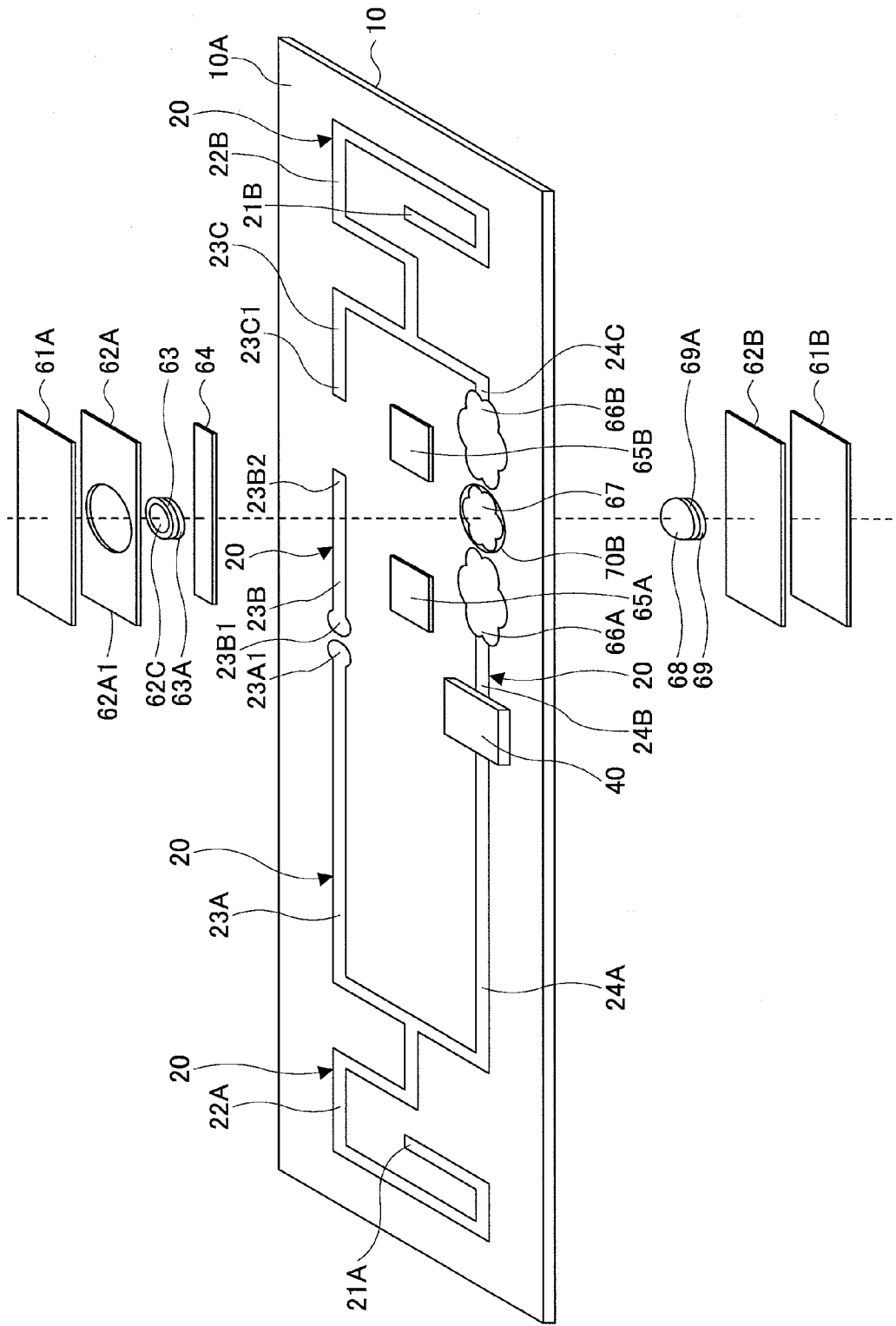

FIG.7

| NO. | Sn | Bi | In | Zn | Ag | MELTING POINT |
|---|---|---|---|---|---|---|
| 1 | 16.5 | 32.5 | 51 | | | 60°C |
| 2 | | 34 | 66 | | | 72°C |
| 3 | 17.3 | 57.5 | 25.2 | | | 79°C |
| 4 | 48 | | 52 | | | 117°C |
| 5 | 40 | 56 | | 4 | | 130°C |
| 6 | 43 | 57 | | | | 139°C |
| 7 | | | 97 | | 3 | 143°C |
| 8 | | | 100 | | | 156°C |
| 9 | 91 | | | 9 | | 199°C |
| 10 | 96.5 | | | | 3.5 | 221°C |

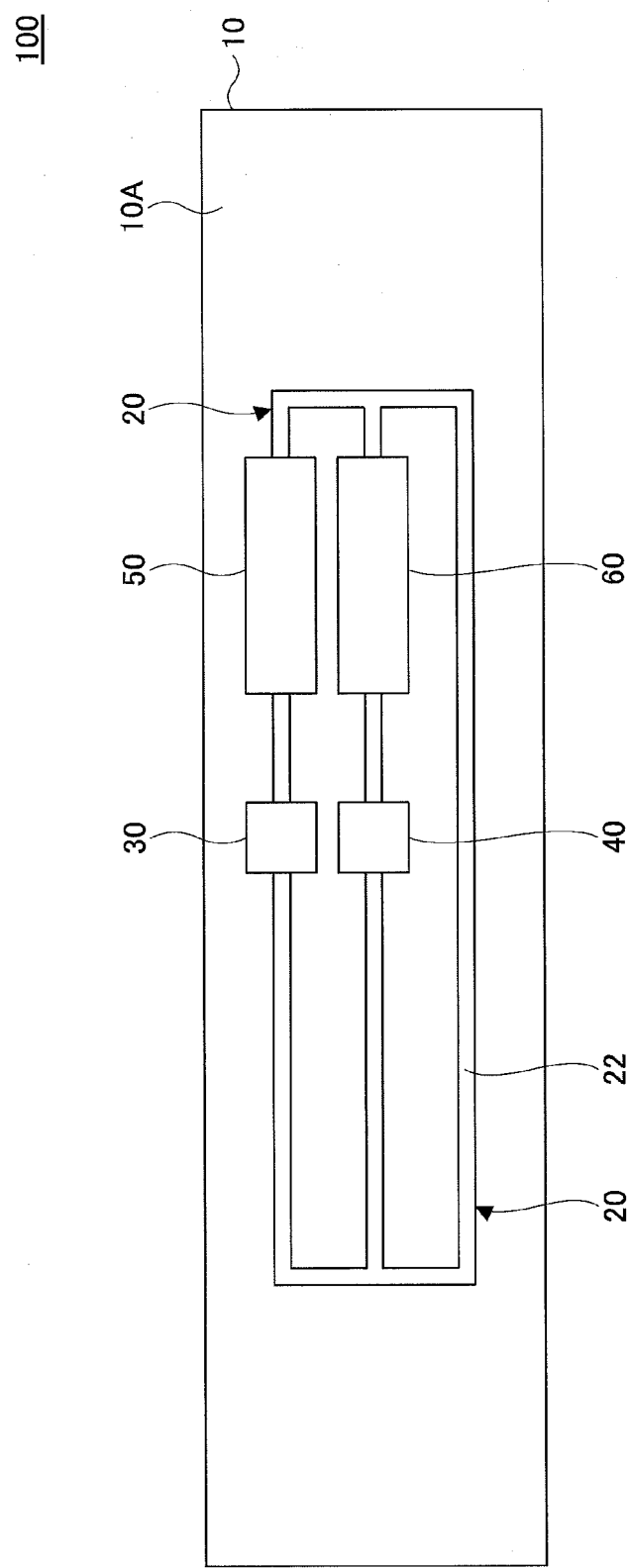

RFID TAG AND FUSE

CROSS-REFERENCE TO RELATED APPLICATIONS

This application is a continuation application of International Application PCT/JP2011/073020 filed on Oct. 5, 2011 and designates the U.S., the entire contents of which are incorporated herein by reference.

FIELD

The disclosure discussed herein relate to an RFID (Radio Frequency Identification) tag and a fuse.

BACKGROUND

The related art RFID tag includes a plurality of antennas for receiving radio waves, an IC part for performing signal processing on the received radio waves, and thermal fuses disposed on connecting parts between the antennas and the IC part. The thermal fuses are configured to melt by heat generated in the IC part while receiving radio waves exhibiting high signal levels, which may detach the antennas from the IC part. Since the antennas are irreversibly detached, excessive electric power supply to the IC part is terminated, which may prevent the IC part from being damaged by heat.

However, when the management of temperature rise in articles is attempted by utilizing such an RFID tag including the thermal fuses, the identifier of the RFID tag is not able to be read by a reader device after the temperature rises to melt the thermal fuses.

RELATED ART DOCUMENTS

Patent Document

Patent Document 1: Japanese Laid-open Patent Publication No. 2007-089054

SUMMARY

Hence, it is desirable to provide a fuse and an RFID tag capable of being read when the temperature rises.

According to an aspect of an embodiment, there is provided an RFID tag that includes an antenna; a first IC chip connected to the antenna; and a first fuse inserted between the antenna and the first IC chip, or inserted in series with the antenna, where the first fuse becomes electrically conductive at a first temperature or above, and remains in an electrical conductive state after having become electrically conductive.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 4 is a diagram illustrating a state in which solder of the fuse 50 of the RFID tag 100 according to the first embodiment has melted;

FIG. 5B is an exploded diagram of the fuse 60;

FIG. 7 is a table illustrating relationships between composition and melting point of solder;

FIG. 19B is a diagram illustrating modification of the antenna pattern of the RFID tag 100 according to the first embodiment;

DESCRIPTION OF EMBODIMENTS

In the following, preferred embodiments are described with reference to the accompanying drawings.

First, a description is given of an embodiment of an RFID tag to which a fuse is applied.

First Embodiment

Figure 1A:
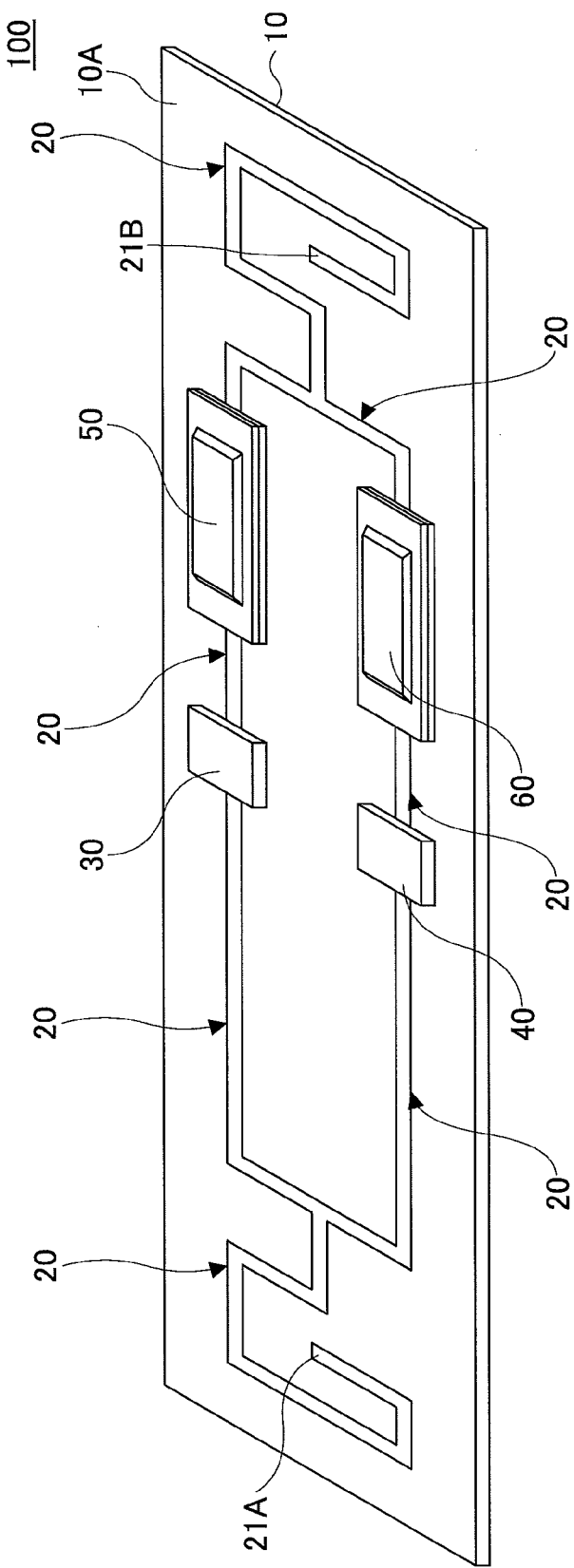
FIG. 1A is a perspective diagram illustrating an RFID tag 100 according to a first embodiment.
Figure 1B:
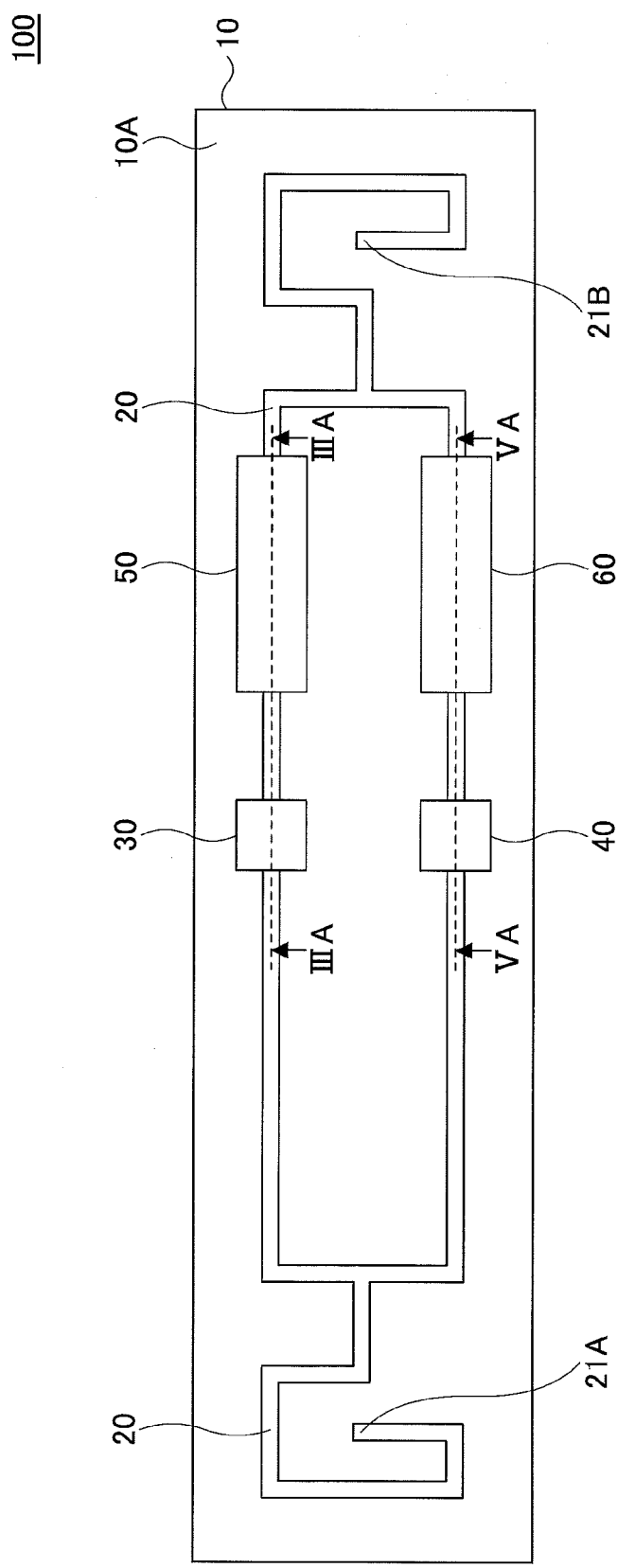
FIG. 1B is a plan diagram illustrating the RFID tag 100 according to the first embodiment.
Figure 2:
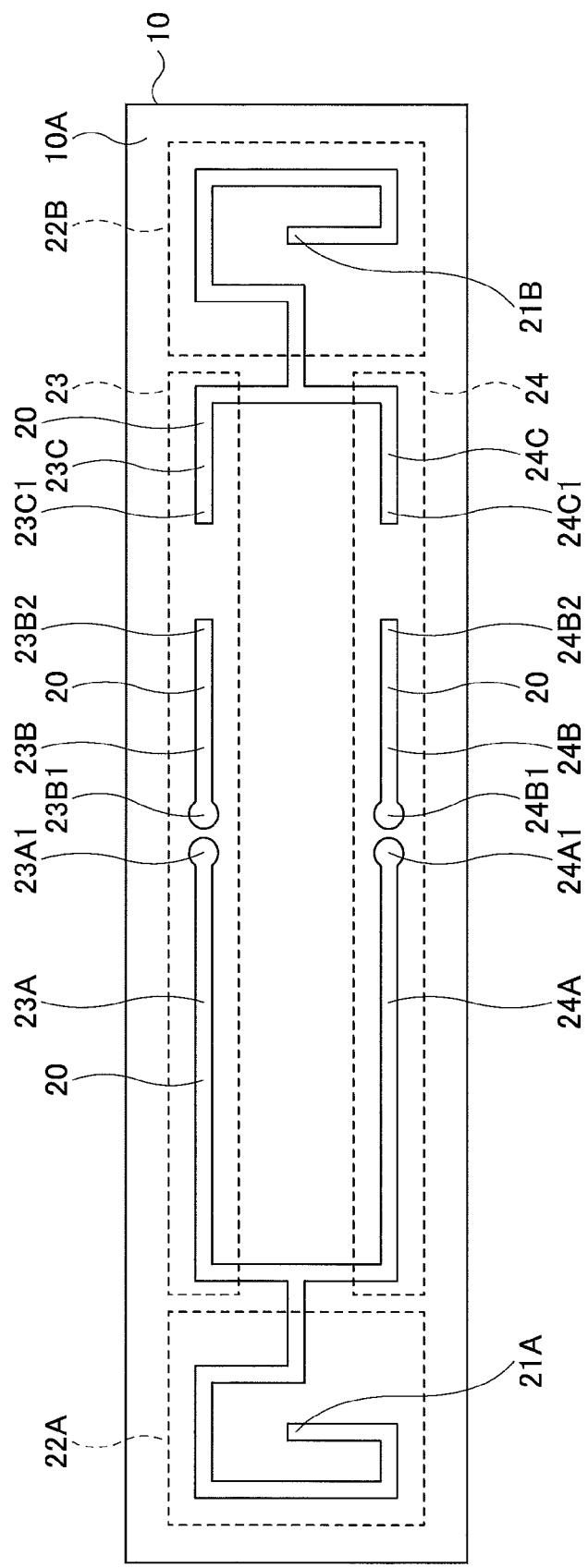
FIG. 2 is a diagram illustrating an antenna pattern of the RFID tag 100 according to the first embodiment.

FIG. 1A is a perspective diagram illustrating an RFID tag 100 according to a first embodiment, and FIG. 1B is a plan diagram illustrating the RFID tag 100 according to the first embodiment. FIG. 2 is a diagram illustrating an antenna pattern of the RFID tag 100 according to the first embodiment.

As illustrated in FIGS. 1A and 1B, the RFID tag 100 of the first embodiment includes a substrate 10, an antenna 20, IC chips 30 and 40, and fuses 50 and 60.

In the RFID tag 100 of the first embodiment, one of the fuses 50 and 60 becomes conductive according to the ambient temperature, such that an identifier (ID) of the IC chip 30 or 40 may be read by a reader device.

The reader device herein indicates a device configured to read an identifier (ID) of an RFID tag by transmitting a reading signal at a radio frequency (RF) bandwidth and receiving the signal returned from the RFID tag. In the following, a description is given of an example in which the ID of the RFID tag 100 of the first embodiment is read by a reader device; however, a reader-writer device that is also be capable of writing an ID into the RFID tag may be employed to read the ID of the RFID tag of the first embodiment.

The substrate 10 illustrated in FIGS. 1A and 1B may, for example, be a sheet-like member made of polyethylene terephthalate (PET) or glass epoxy resin. The substrate 10 includes a surface 10A on which the antenna 20 is formed, and the IC chips 30 and 40, and the fuses 50 and 60 are mounted on the antenna 20. The substrate 10 made of PET may include elasticity, or the substrate 10 made of glass epoxy resin may exhibit rigidity.

As illustrated in FIGS. 1A and 1B, the antenna 20 is formed on the surface 10A, and the IC chips 30 and 40, and the fuses 50 and 60 are connected to the antenna 20.

FIG. 2 illustrates a pattern of the antenna 20. The antenna 20 is a dipole antenna having a pair of terminals 21A and 21B, and includes antenna parts 22A, 22B, 23, and 24. The antenna 20 patterned as illustrated in FIG. 2 forms an electric circuit configured to transmit or receive a signal at an RF bandwidth.

The antenna part 22A includes the terminal 21A, and has a rectangular coil-like shape in a planar view. Since the antennal part 22A has such a rectangular coil-like shape, the entire length of the antenna 20 may be shortened.

The antenna part 22B includes the terminal 21B, and has a rectangular coil-like shape in a planar view. Since the antennal part 22B has such a rectangular coil-like shape, the entire length of the antenna 20 may be shortened.

Note that the following lengths are configured to be identical: the length from the terminal 21A to a terminal 23A1; the length from the terminal 21A to a terminal 24A1; the length from the terminal 21B to a terminal 23B1 (including the length between a terminal 23B2 and a terminal 23C1); and the length from the terminal 21B to a terminal 24C1 (including the length between a terminal 24B2 and the terminal 24C1).

It is preferable that each of the above lengths be ¼ of the wavelength at a communication frequency for allowing the reader device to read the identifiers of the IC chips 30 and 40. However, in order to downsize the RFID tag 100, the above lengths between the terminals may be shorter than ¼ of the wavelength at the above communication frequency.

Further, the fuses 50 and 60 are respectively disposed between terminals 23B2 and 23C1, and between terminals 24B2 and 24C1 in respective intervals between the terminals 21B and 23B1, and between the terminal 21B and a terminal 24B1. That is, the fuses 50 and 60 are inserted in series with the antenna 20.

The antenna 20, and the fuses 50 and 60 have different dielectric constants and different conductivities. Hence, the length from the terminal 21B to the terminal 23B1 (including the length between the terminal 23B2 and the terminal 23C1), and the length from the terminal 21B to the terminal 24B1 (including the length between the terminal 24B2 and the terminal 24C1) may be determined based on the dielectric constants and conductivities of the fuses 50 and 60.

The antenna part 23 includes antenna parts 23A, 23B, and 23C, and is disposed in parallel with the antenna part 24 between the antenna parts 22A and 22B. The antenna part 23 is an example of a first antenna part disposed mutually in parallel with the antenna part 24.

The antenna part 23A includes the terminal 23A1 integrally formed with the antenna part 22A and an antenna part 24A, and the terminal 23A1 is configured to be connected with a first terminal of the IC chip 30.

The antenna part 23B includes the terminals 23B1 and 23B2. The terminal 23B1 is connected to a second terminal of the IC chip 30, and the terminal 23B2 is connected to a first terminal of the fuse 50.

The antenna part 23C includes the terminal 23C1 integrally formed with the antenna part 22B and an antenna part 24C, and the terminal 23C1 is configured to be connected with a second terminal of the fuse 50.

The antenna part 24 includes the antenna parts 24A and 24C and an antenna part 24B, and is disposed in parallel with the antenna part 23 between the antenna parts 22A and 22B. The antenna part 24 is an example of a second antenna part that is disposed mutually in parallel with the antenna part 23.

The antenna part 24A includes the terminal 24A1 integrally formed with the antenna part 22A and the antenna part 23A, and the terminal 24A1 is configured to be connected with a first terminal of the IC chip 40.

The antenna part 24B includes the terminals 24B1 and 24B2. The terminal 24B1 is connected to a second terminal of the IC chip 40, and the terminal 24B2 is connected to a first terminal of the fuse 60.

The antenna part 24C includes the terminal 24C1 integrally formed with the antenna part 22B and the antenna part 23C, and the terminal 24C1 is configured to be connected with a second terminal of the fuse 60.

The antenna 20 having the above configuration may be formed of silver paste, aluminum foil, or copper foil. In a case of the antenna 20 being formed of silver paste, the silver paste may be screen-printed on the surface 10A of the substrate 10. In a case of the antenna 20 being formed of aluminum foil or copper foil, the aluminum foil or the copper foil formed on the surface 10A of the substrate 10 may be etched.

The IC chips 30 and 40 are, as illustrated in FIGS. 1A and 1B, mounted on the surface 10A of the substrate 10, and are connected to the antenna 20. The IC chips 30 and 40 may, for example, be a surface mount device (SMD) package chip capable of being mounted on the surface 10A of the substrate 10.

The respective terminals of the IC chip 30 are connected to the terminal 23A1 and the terminal 23B1 illustrated in FIG. 2. The respective terminals of the IC chip 40 are connected to the terminal 24A1 and the terminal 24B1 illustrated in FIG. 2.

When receiving reading signals at the RF bandwidth from the reader device for the RFID tag via the antenna 20, the IC chips 30 and 40 are activated by electric power of the received signals to generate signals representing identifiers via the antenna 20.

The IC chips 30 and 40 have mutually different identifiers (IDs). Further, the fuses 50 and 60 have different temperature ranges to become electrically conductive, such that the IC chips 30 and 40 will not be activated simultaneously. The IC chips 30 and 40 are respective examples of a first IC chip and a second IC chip.

Hence, the reader device may be able to read the identifier of the IC chip 30 or the IC chip 40 of the RFID tag 100.

The fuse 50 is an example of a first fuse that includes solder disposed between a pair of contact points, and becomes electrically conductive when the solder has melted by being heated to a first temperature (a melting point) or above. A configuration and a function of the fuse 50 will be described later with reference to FIGS. 3A and 3B.

The fuse 60 is an example of a second fuse that includes solder disposed between a pair of contact points. The fuse 60 is electrically conductive between the contact points before the solder is heated to a second temperature or above to melt, and becomes electrically non-conductive when the solder has melted by being heated to the second temperature or above. A configuration and a function of the fuse 60 will be described later with reference to FIGS. 5A and 5B.

Figure 3A:
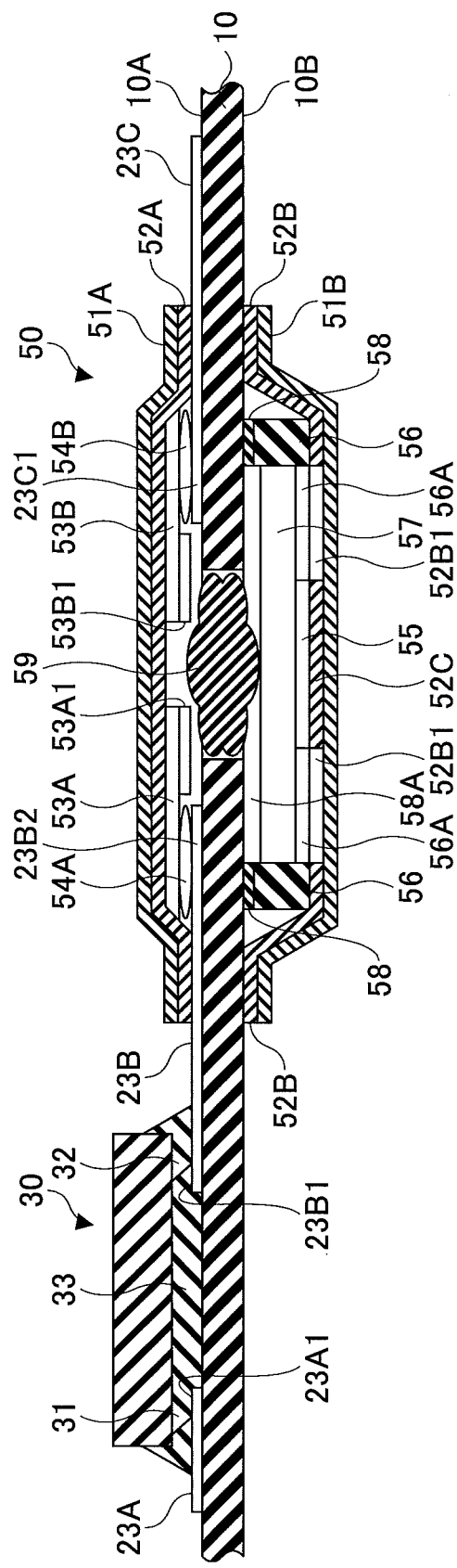
FIG. 3A is a cross-sectional diagram illustrating the RFID 100 according to the first embodiment including an IC chip 30 and a fuse 50.
Figure 3B:
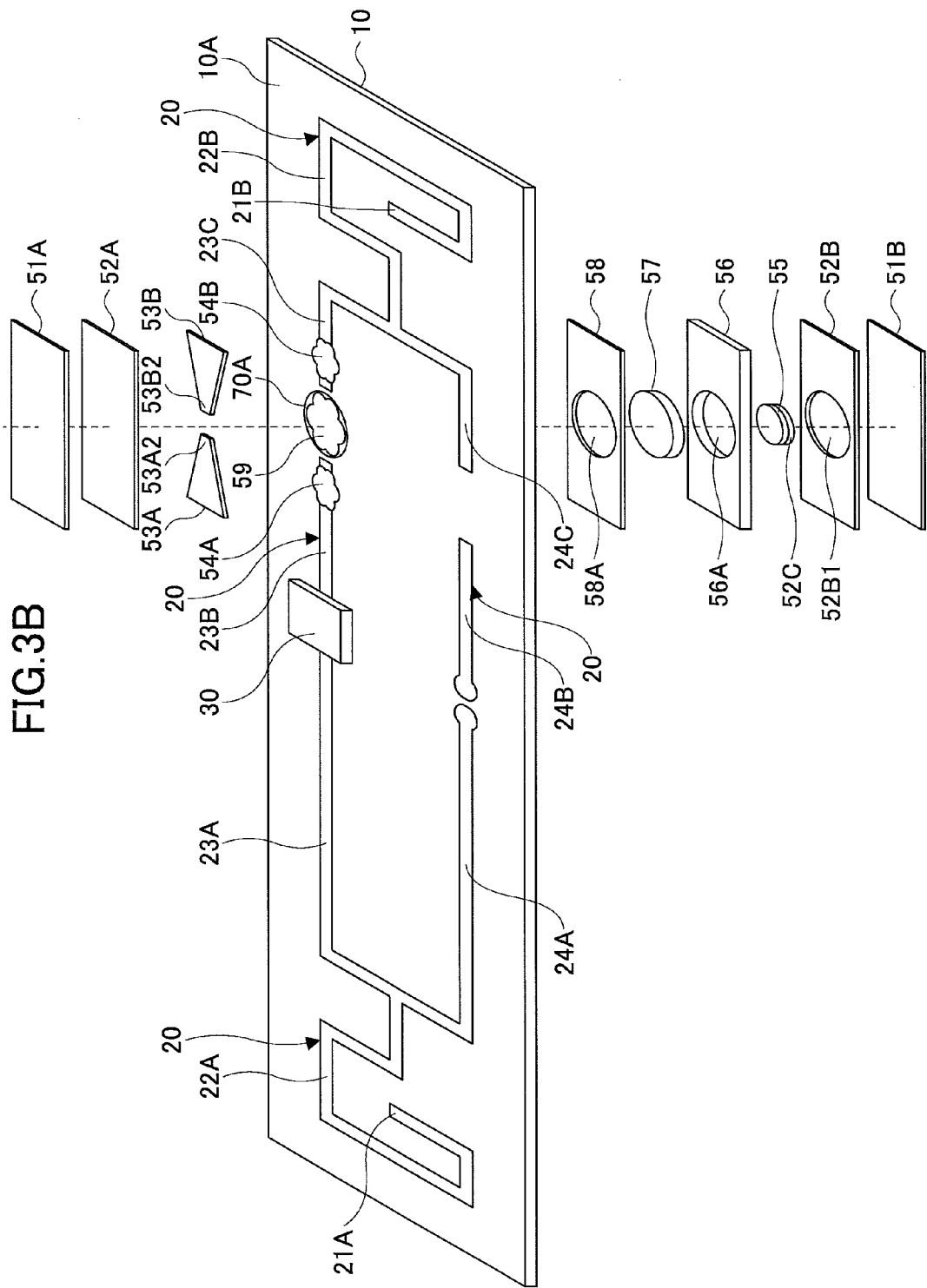
FIG. 3B is an exploded diagram of the fuse 50.

FIG. 3A is a cross-sectional diagram illustrating the RFID 100 according to the first embodiment including the IC chip 30 and the fuse 50, and FIG. 3B is an exploded diagram of the fuse 50. FIG. 4 is a diagram illustrating a state in which the solder of the fuse 50 of the RFID tag 100 of the first embodiment has melted.

FIG. 3A is a cross-sectional diagram cut along a broken line IIIA-IIIA of FIG. 1B. Note that illustration of the IC chip 40 and the fuse 60 is omitted from FIG. 3B for facilitating understanding.

Respective bumps 31 and 32 are connected to the terminal 23A1 of the antenna part 23A and the terminal 23B1 of the antenna part 23B with solder while being fixed with underfill resin 33 such that the IC chip 30 is flip-chip mounted on the substrate 10.

Note that this example describes the IC chip 30 being flip-chip mounted on the surface 10A of the substrate 10; however, the technique of mounting the IC chip 30 on the substrate 10 is not limited to the flip-chip mounting. For example, the IC chip 30 may be mounted by bare chip mounting techniques other than the flip-chip mounting technique, such as wire-bonding or tape automated bonding (TAB).

The fuse 50 includes cover parts 51A and 51B, double-faced adhesive tapes 52A, 52B and 52C, lands 53A and 53B, electrically conductive adhesives 54A and 54B, a land 55, a spacer 56, a soldering sheet 57, a double-faced adhesive tape 58, and flux 59.

The fuse 50 is formed such that the position of the fuse 50 matches the position of a hole part 70A formed between the terminal 23B2 and the terminal 23C1 of the substrate 10. For example, in a case where the substrate 10 is made of PET, the hole part 70A may be formed by a punching process to penetrate the substrate 10. In a case where the substrate 10 is made of glass epoxy resin, the hole part 70A may be formed by a laser process or a drilling process to penetrate the substrate 10.

The cover parts 51A and 51B may, for example, be flexible film-like members that are formed of a polyethylene terephthalate (PET) film. The cover parts 51A and 51B are disposed in order to protect double-faced adhesive tapes 52A, 52B and 52C, lands 53A and 53B, electrically conductive adhesives 54A and 54B, a land 55, a spacer 56, a soldering sheet 57, a double-faced adhesive tape 58, and flux 59.

Note that the cover parts 51A and 51B may be made of any electrically non-conductive material, so that the materials for the cover parts 51A and 51B are not limited to PET. The cover parts 51A and 51B may, for example, be made of epoxy resin or polycarbonate resin.

The double-faced adhesive tapes 52A, 52B and 52C may, for example, be flame-retardant double-faced adhesive tapes. The flame-retardant double-faced adhesive tapes may be employed because the soldering sheet 57 is designed to melt. However, in a case where the melted soldiering sheet 57 does not cause any damage by using the double-faced adhesive tapes 52A, 52B and 52C exhibiting high heat resistance, the double-faced adhesive tapes 52A, 52B and 52C are not necessarily flame-retardant.

The double-faced adhesive tape 52A is a rectangular double-faced adhesive tape in a planar view, and has vertical and horizontal dimensions that are equal to those of the cover part 51A in a planar view. The double-faced adhesive tape 52A is used for adhering the cover part 51A to the surface 10A of the substrate 10.

The double-faced adhesive tape 52A is a rectangular double-faced adhesive tape in a planar view, and has vertical and horizontal dimensions that are equal to those of the cover part 51A in a planar view. The double-faced adhesive tape 52B has a hole part 52B1 in the center. The diameter of the hole part B1 is configured to be approximately equal to the diameter of a hole part 56A of the spacer 56, and also to the diameter of the soldering sheet 57.

The double-faced adhesive tape 52B is used for adhering the cover part 51B to a rear surface 10B of the substrate 10, and is also used for securing the cover part 51B and the spacer 56.

The double-faced adhesive tape 52C has a round shape in a planar view. The diameter of the double-faced adhesive tape 52C is set to be equal to the diameter of the land 55 and smaller than the diameter of the hole part 52B1. The double-faced adhesive tape 52C is user for adhering the land 55 to the cover part 51B.

The land 53A is adhered to the terminal 23B2 of the antenna part 23B via the electrically conductive adhesive 54A. The land 53B is adhered to the terminal 23C1 of the antenna part 23C via the electrically conductive adhesive 54B.

The lands 53A and 53B may, for example, be made of copper. The respective surfaces (lower surfaces in FIGS. 3A and 3B) of the lands 53A and 53B to which electrically conductive adhesives are applied may be coated with solders 53A1 and 53B1. The lands 53A and 53B are an example of a pair of first contact points of the fuse 50. Further, the solders 53A1 and 53B1 are examples of first spare solders that are, after the soldering sheet 57 has melted, disposed on respective surfaces of the lands 53A and 53B to which the soldering sheet 57 is connected. Note that the lands 53A and 53B are not necessarily coated with the solders 53A1 and 53B1.

The respective lengths of the lands 53A and 53B are configured such that respective pointed ends 53A2 and 53B2 (see FIG. 3B) of the lands 53A and 53B2 are located above the hole part 70A in a planar view. The lands 53A and 53B are trapezoidal copper sheets, and respective upper bases of the lands 53A and 53B are located at the pointed ends 53A2 and 53B2 in a planar view.

The electrically conductive adhesives 54A and 54B may, for example, be silver paste. The electrically conductive adhesives 54A and 54B are applied to the terminal 23B2 of the antenna part 23B and the terminal 23C1 of the antenna part 23C, respectively. Note that electrically conductive adhesive obtained by mixing metallic power other than silver with epoxy resin adhesive or electrically conductive double-faced adhesive tapes may be used instead of the electrically conductive adhesives 54A and 54B.

The respective lands 53A and 53B are adhered via the electrically conductive adhesives 54A and 54B to the terminal 23B2 of the antennal 23B and the terminal 23C1 of the antennal 23C of the substrate 10; and the cover parts 51A and 51B and the double-faced adhesive tapes 52A and 52B are adhered such that the cover parts 51A and 51B and the double-faced adhesive tapes 52A and 52B cover the lands 53A and 53B and the hole part 70A from the surface 10A side of the substrate 10.

The land 55 is a thin disk-like copper sheet, and has a diameter smaller than the diameter of the hole part 52B1 of the double-faced adhesive tape 52B. The diameter of the land 55 is set to be equal to the diameter of the double-faced adhesive tape 52C.

The land 55 is adhered to the cover part 51B with the double-faced adhesive tape 52C such that the central axis of the double-faced adhesive tape 52C matches the central axis of the hole part 52B1.

The spacer 56 is a rectangular plate-like member in a planar view, and has dimensions identical to those of the cover part 51B, and also to those of the double-faced adhesive tape 52B. The spacer 56 may, for example, be formed of a heat resistant film that will not be damaged when the soldering sheet 57 has melted. The spacer 56 has the hole part 56A in the center. Since the disk-like soldering sheet 57 is fit into the hole part 56A, the diameter of the hole part 56A is approximately identical to the diameter of the soldering sheet 57.

Further, the thickness of the spacer is configured to be slightly greater than a total thickness of the land 55 and the soldering sheet 57, so as to provide space above the soldering sheet 57 in the height direction in a state in which the land 55 and the soldering sheet 57 are fit into the hole part 56A in a superimposed fashion, as illustrated in FIG. 3A.

The spacer 56 is adhered to the cover part 51B with the double-faced adhesive tape 52B, such that no misalignment is present in external dimensions between the cover part 51B and the double-faced adhesive tape 52 by aligning the cover part 51B with the double-faced adhesive tape 52.

The soldering sheet 57 is disk-like solder having a round shape in a planar view, and an example of first solder. As illustrated in FIGS. 3A and 3B, in a state where the soldering sheet 57 has not melted, the diameter of the soldering sheet 57 is approximately identical to that of the hole part 52B1 of the double-faced adhesive tape 52B, to that of the hole part 56A of the spacer 56, and to that of the hole part 58A of the double-faced adhesive tape 58. The soldering sheet 57 has the above configuration due to the following reason. That is, when the respective diameters of the hole parts 52B1 and 58A are smaller than the diameter of the soldering sheet 57, the double-faced adhesive tapes 52A and 52B are adhered to the periphery of the soldering sheet 57. Hence, the double-faced adhesive tapes 52A and 52B may be unable to adhere between the lands 53A and 53B when the soldering sheet 57 has melted.

The soldering sheet 57 that is fit into the hole part 56A of the spacer 56 is in contact with the upper surface of the land 55. The soldering sheet 57 may, for example, be obtained by processing lead-free tin solder in a disk shape.

The double-faced adhesive tape 58 is a rectangular double-faced adhesive tape in a planar view, and has vertical and horizontal dimensions that are equal to those of the cover part 51B, to those of the double-faced adhesive tape 52B, and to those of the spacer 56 in a planar view. The double-faced adhesive tape 58 has a hole part 58A in the center. The diameter of the hole part 58A is configured to be approximately identical to the diameter of the soldering sheet 57. The double-faced adhesive tape 58 is used for securing the spacer 56 to the rear surface 10B of the substrate 10. Note that a material for the double-faced adhesive tape may be the same as that used for the double-faced adhesive tape 52B.

The flux 59 serves as a solvent of the soldering sheet 57, and is an example of a first solvent disposed between the soldering sheet 57 and lands 53A and 53B in a state where the soldering sheet 57 has not melted. The flux 59 may, for example, contain botanical natural resin such as rosin, and be disposed above the soldering sheet 57.

The flux 59 is, as illustrated in FIG. 3A, disposed above the soldering sheet 57, and is also disposed between the soldering sheet 57 and the lands 53A and 53B in a state where the soldering sheet 57 has not melted. In this state, the soldering sheet 57 and the lands 53A and 53B are not connected such that the fuse 50 is in a non-conductive state.

The flux 59 may melt together with the soldering sheet 57 when soldering sheet 57 starts melting with an increase in the ambient temperature of the fuse 50. The surface tension between the lands 53A and 53B and the land 55 decreases due to the melted flux 59 to improve solder wettability. Hence, the lands 53A and 53B, and the land 55 are connected via solder 57A formed of the melted solder sheet 57 as illustrated in FIG. 4.

The lands 53A and 53B are coated with solders 53A1 and 53B1, respectively, and hence, parts coated with the solders 53A1 and 53B1 form a condensation point. Further, the solder 57A moves lower under its own weight. Hence, the solder 57A is disposed between the lands 53A and 53B, and the land 55, such that the solder 57A connects between the land 53A and the land 53B.

When the temperature of the solder 57A thus disposed between the lands 53A and 53B, and the land 55 is decreased to be lower than the melting point of the solder 57A, the solder 57A becomes solidified between the lands 53A and 53B, and the land 55. Hence, even when the temperature of the solder 57A becomes lower than the melting point (i.e., a first temperature) of the solder 57A, the fuse 50 remains in an electrical conductive state between the land 53A and the land 53B.

Note that even when the solder 57A is heated to the melting point (first temperature) again, the solder 57A remains on the surface of the solders 53A1 and 53B1 serving the as condensation point. Further, even when the temperature of the solder 57A becomes lower than the melting point (first temperature) again, the fuse 50 remains in an electrical conductive state between the land 53A and the land 53B.

That is, the fuse 50 becomes electrically conductive when the temperature of the fuse 50 reaches the melting point (first temperature) or above, and remains in the electrical conductive state once being electrically conductive.

As described above, when the temperature of the soldering sheet 57 has reached the melting point (first temperature) or above to cause the soldering sheet 57 to melt, the fuse 50 has become electrically conductive. Hence, the identifier (ID) of the IC chip 30 may become readable by the reader device for the RFID tag 100 via the antenna 20.

Figure 5A:
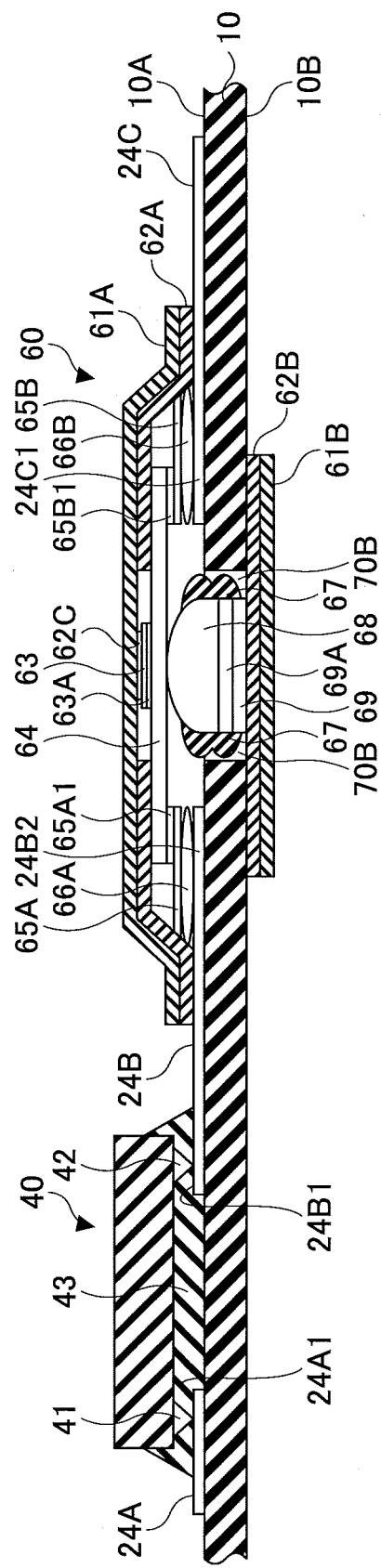
FIG. 5A is a cross-sectional diagram cut along a broken line VA-VA of FIG. 1B illustrating the RFID 100 according to the first embodiment including an IC chip 40 and a fuse 60.

Next, a description is given, with reference to FIGS. 5A and 5B, of a mounting structure of the IC chip 40 onto the substrate 10 in the RFID tag 100 of the first embodiment, and a structure of the fuse 60.

Figure 6:
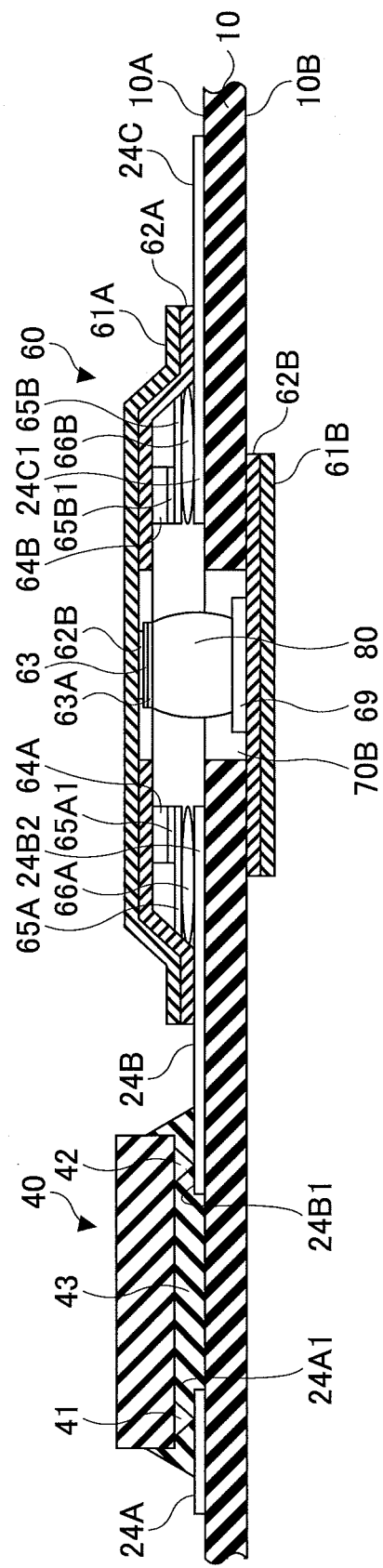
FIG. 6 is a diagram illustrating a state in which solder of the fuse 60 in the RFID tag 100 according to the first embodiment has melted.

FIG. 5A is a cross-sectional diagram illustrating the RFID 100 according to the first embodiment including the IC chip 40 and the fuse 60, and FIG. 5B is an exploded diagram of the fuse 60. FIG. 5A is a cross-sectional diagram cut along a broken line VA-VA of FIG. 1B. FIG. 6 is a diagram illustrating a state in which the solder of the fuse 60 in the RFID tag 100 of the first embodiment has melted.

FIG. 5A is a cross-sectional diagram cut along a broken line VA-VA of FIG. 1B. Note that illustration of the IC chip 30 and the fuse 50 is omitted from FIG. 5B for facilitating understanding.

Respective bumps 41 and 42 are connected to the terminal 24A1 of the antenna part 24A and the terminal 24B1 of the antenna part 24B with solder while being fixed with underfill resin 43, such that the IC chip 40 is flip-chip mounted on the substrate 10.

Note that this example describes the IC chip 40 being flip-chip mounted on the surface 10A of the substrate; however, the technique of mounting the IC chip 40 on the substrate 10 is not limited to the flip-chip mounting. For example, the IC chip 40 may be mounted by bare chip mounting techniques other than the flip-chip mounting technique, such as wire-bonding or tape automated bonding (TAB).

The fuse 60 includes cover parts 61A and 61B, double-faced adhesive tapes 62A, 62B and 62C, a land 63, a soldering bridge 64, lands 65A and 65B, electrically conductive adhesives 66A and 66B, flux 67, a soldering bump 68, and a land 69.

The fuse 60 is formed such that the position of the fuse 60 matches the position of the hole part 70B formed between the terminal 24B2 and the terminal 24C1 of the substrate 10. For example, in a case where the substrate 10 is made of PET, the hole part 70B may be formed by a punching process to penetrate the substrate 10. In a case where the substrate 10 is made of glass epoxy resin, the hole part 70A may be formed by a laser process or a drilling process to penetrate the substrate 10.

The cover parts 61A and 61B may, for example, be flexible film-like members that are formed of a polyethylene terephthalate (PET) film. The cover parts 61A and 61B are disposed in order to protect the double-faced adhesive tapes 62A, 62B and 62C, the land 63, the soldering bridge 64, the lands 65A and 65B, the electrically conductive adhesives 66A and 66B, the flux 67, the soldering bump 68, and the land 69.

Note that the cover parts 61A and 61B may be made of any electrically non-conductive material, so that the materials for the cover parts 61A and 61B are not limited to PET. The cover parts 61A and 61B may, for example, be made of epoxy resin or polycarbonate resin.

The double-faced adhesive tapes 62A, 62B and 62C may, for example, be flame-retardant double-faced adhesive tapes. The flame-retardant double-faced adhesive tapes may be employed because the soldering bridge 64 and the soldering bump 68 are designed to melt. However, in a case where the melted soldering bridge 64 and the soldering bump 68 do not cause any damage by using the double-faced adhesive tapes 62A, 62B and 62C exhibiting high heat resistance, the double-faced adhesive tapes 62A, 62B and 62C are not necessarily flame-retardant.

The double-faced adhesive tape 62A is a rectangular double-faced adhesive tape in a planar view, and has vertical and horizontal dimensions equal to those of the cover part 61A in a planar view. The double-faced adhesive tape 62A is used for adhering the cover part 61A to the surface 10A of the substrate 10, and is also used for securing the soldering bridge 64 between the lands 65A and 65B. The double-faced adhesive tape 62A has a hole part 62A1 in the center. The diameter of the hole part 62A1 is configured to be larger than that of the land 63. The reason for this will be described later.

The double-faced adhesive tape 62B is a rectangular double-faced adhesive tape in a planar view, and has vertical and horizontal dimensions that are equal to those of the cover part 61B in a planar view. The double-faced adhesive tape 62B is used for adhering the cover part 61B to the rear surface 10B of the substrate 10, and is also used for securing the soldering bump 68 and the land 69.

The double-faced adhesive tape 62C has a round shape in a planar view. The diameter of the double-faced adhesive tape 62C is configured to be smaller than that of the land 63. The double-faced adhesive tape 62C is user for adhering the land 63 to the cover part 61A. The double-faced adhesive tape 62C adheres the land 63 to the cover part 61A such that the central axis of the double-faced adhesive tape 62C is aligned with the central axis of the land 63, and the central axis of the hole part 62A1.

The land 63 is adhered to the cover part 61A with the double-faced adhesive tape 62C such that the central axis of the land 63 is aligned with the central axis of the hole part 62A1 of the double-faced adhesive tape 62A.

The land 63 may, for example, be made of copper. The land 63 may include a surface coated with the solder 63A, the surface being opposite to the surface adhered to the cover part 61A with the double-faced adhesive tape 62C. The solder 63A is an example of second spare solder. Note that the land 63 is not necessarily coated with the solder 63A.

The soldering bridge 64 is a long and thin plate-like solder, and has a sufficient length to connect the land 65A and the land 65B. The solder bridge 64, before melting, is fixed such that a center of an upper surface of the solder bridge 64 in a longitudinal direction is in contact with the solder 63A of the land 63, a center of a lower surface of the solder bridge 64 in a longitudinal direction is in contact with an upper part of the soldering bump 68, and lower surfaces of two opposite ends of the soldering bridge 64 are attached to the lands 65A and 65B.

The double-faced adhesive tape 62A is adhered to the upper surfaces of the two opposite ends of the soldering bridge 64. The soldering bridge 64, before melting, is an example of a second solder, which connects the lands 65A and 65B to cause the lands 65A and 65B to be electrically conductive as illustrated in FIG. 5A.

The land 65A is adhered to the terminal 24B2 of the antenna part 24B via the electrically conductive adhesive 66A. The land 65B is adhered to the terminal 24C1 of the antenna part 24C via the electrically conductive adhesive 66B.

The lands 65A and 65B are an example of a pair of second contact points of the fuse 60. The lands 65A and 65B may, for example, be compressively adhered to the electrically conductive adhesives 66A and 66B, respectively, while being locally heated by a reflow process.

The lands 65A and 65B may, for example, be made of copper. The respective surfaces (upper surfaces in FIGS. 5A and 5B) of the lands 65A and 65B to which electrically conductive adhesives are applied, are coated with solders 65A1 and 65B1. The solders 65A1 and 65B1 are in contact with the soldering bridge 64. The solders 65A1 and 65B1 are an example of second spare solder. Note that the lands 65A and 65B are not necessarily coated with the solders 65A1 and 65B1.

The lands 65A and 65B are configured to have such lengths that the lands 65A and 65B do not overlap the hole part 70B and are offset from the hole part 70B in a planar view. Hence, the lands 65A and 65B do not overlap the land 63 in a planar view.

The electrically conductive adhesives 66A and 66B may, for example, be silver paste. The electrically conductive adhesives 66A and 66B are applied to the terminal 24B2 of the antenna part 24B, and to the terminal 24C1 of the antenna part 24C. The electrically conductive adhesives 66A and 66B fix the lands the 65A and 65B to the terminals 24B2 and 24C1, respectively. Note that electrically conductive adhesive obtained by mixing metallic power other than silver with epoxy resin adhesive, or electrically conductive double-faced adhesive tapes may be used instead of the electrically conductive adhesives 66A and 66B.

The flux 67 is disposed between the soldering bump 68 and the soldering bridge 64, and is also disposed in the periphery of the soldering bump 68 inside the hole part 70B of the substrate 10.

The flux 67 is a solvent of the soldering bridge 64 and the soldering bump 68, and is an example of a second solvent. The flux 67 may, for example, contain botanical natural resin such as rosin.

The flux 67 is, as illustrated in FIG. 5A, disposed between the soldering bridge 64 and the soldering bump 68, and is also disposed in the periphery of the soldering bump 68 in a state where the soldering bridge 64 and the soldering bump 68 have not melted. In this state, the land 65A and the land 65B are electrically conductive via the soldering bridge 64.

The soldering bump 68 is bump-like solder, and is disposed on the solder 69A of the land 69. The apex of the soldering bump 68 is in contact with a central part in a longitudinal direction of the soldering bridge 64.

The soldering bump 68 has a round shape in a planar view, and is cylindrical solder having a round top in a lateral view. The soldering bump 68 is disposed such that the central axis of the soldering bump 68 matches the central axis of the hole part 70B of the substrate 10. The diameter of the soldering bump 68 is set such that there is a gap between the soldering bump 68 and an inner wall of the hole part 70B.

Further, the height of the soldering bump 68 is set such that the upper part of the soldering bump 68 is in contact with the lower surface of the soldering bridge 64 in a state where the fuse 60 is constructed as illustrated in FIG. 5A. The flux 67 is disposed on the upper part and in the periphery of the soldering bump 68.

The land 69 is a thin disk-like copper sheet, and has a diameter equal to that of the soldering bump 68. The soldering bump 68 is mounted on the land 69 such that the central axis of the soldering bump 68 matches the central axis of the land 69. Accordingly, there is a gap between the land 69 and the hole part 70B of the substrate 10 on the lateral side of the land 69. Further, a surface of the land 69, on which the soldering bump is mounted (the upper surface in FIG. 5A), is coated with the solder 69A.

The land 69 is attached to the cover part 61B with the double-faced adhesive tape 62B in a state where the soldering bump 68 is mounted on the land 69.

In the above-described fuse 60, the flux 67 may melt together with the soldering bridge 64 and the soldering bump 68 when the soldering bridge 64 and the soldering bump 68 start melting due to an increase in ambient temperature of the fuse 60.

The surface tension between the lands 63, 65A, 65B and 69, and melted solder of the soldering bridge 64 and the soldering bump 68 is decreased due to the melted flux 67 to improve wettability of the solder.

As a result, melted solder 80 formed from the melted soldering bridge 64 and the melted soldering bump 68 gathers between the land 63 and the land 69 as illustrated in FIG. 6 such that the land 65A and the land 65B become electrically non-conductive. In this case, soldering bridges 64A and 64B may partially remain between the lands 65A and 65B, and the double-faced adhesive tape 62A.

Since wettability of the surfaces of the lands 63 and 69 is high due to the lower surface of the land 63 being coated with the solder 63A and the upper surface of the land 69 being coated with the solder 69A, the surfaces of the lands 63 and 69 serve as condensation points for the melted solder 80 that has melted from the soldering bridge 64 and the soldering bump 68. Hence, the solder 80 may gather easily between the land 63 and the land 69.

When the melted soldering bridge 64 gathers between the land 63 and the land 69, the land 65A and the land 65B are not connected via the soldering bridge 64. Hence, the fuse 60 becomes electrically non-conductive.

The reason for forming the hole part 62A1 in the double-faced adhesive tape 62A is that the electrical connection between the lands 65A and 65B is cut off by reliably melting the central part in the longitudinal direction of the soldering bridge 64 when the soldering bridge 64 melts. Hence, the diameter of the land 63 that serves as the condensation point for the melted solder 80 is smaller than the diameter of the hole part 62A1, and the central axis of the land 63 matches the central axis of the hole part 62A1.

Further, it is preferable that the diameter of the soldering bump 68 be smaller than that of the hole part 62A1, and that the central axis of the land 63 match the central axis of the hole part 62A1 in order to reliably cut the electrical connection between the land 65A and the land 65B.

Further, once the fuse 60 has become electrically non-conductive by its temperature reaching the second temperature or above, the land 65A and the land 65B will not be connected via the solder 80 again by being heated thereafter. Moreover, once the fuse 60 has become electrically non-conductive by its temperature reaching the second temperature or above, the land 65A and the land 65B will not be connected via the solder 80 again by being cooled thereafter (i.e., the cooled solder 80 will not melt). Hence, once the fuse 60 has become electrically non-conductive by its temperature reaching the second temperature or above, the fuse 60 remains in an electrical non-conductive state thereafter.

As described above, since the fuse 60 becomes electrically non-conductive by heating the soldering bridge 64 and the soldering bump 68 to the second temperature or above to cause the soldering bridge 64 and the soldering bump 68 to melt, the IC chip 40 is not capable of being read by the reader device for the RFID tag 100 via the antenna 20.

Next, a description is given, with reference to FIG. 7, of the first temperature at which the fuse 50 becomes electrically conductive, and the second temperature at which the fuse 60 becomes electrically non-conductive.

FIG. 7 is a table illustrating relationships between composition and melting point of solder. FIG. 7 illustrates compositions of solder that do not contain lead (Pb) and cadmium (Cd).

The solder having the compositions illustrated in FIG. 7 may, for example, be used for the soldering sheet 57 of the fuse 50, the soldering bridge 64 and the soldering bump 68 of the fuse 60 in the RFID tag 100 according to the first embodiment.

Materials for the solder illustrated in FIG. 7 may include tin (Sn), bismuth (Bi), indium (In), zinc (Zn), and silver (Ag). FIG. 7 illustrates ten types of solder having various compositions containing any of tin (Sn), bismuth (Bi), indium (In), zinc (Zn), and silver (Ag), and respective melting points. FIG. 7 illustrates sequentially from above a No. 1 solder having the lowest melting point to a No. 10 solder having the highest melting point.

The No. 1 solder includes Sn: 16.5%, Bi: 32.5% and In: 51%, and the melting point of the No. 1 solder is 60° C. The No. 2 solder includes Bi: 24%, and In: 66% and the melting point of the No. 2 solder is 72° C. The No. 3 solder includes Sn: 17.3%, Bi: 57.5% and In: 25.2%, and the melting point of the No. 3 solder is 79° C.

The No. 4 solder includes Sn: 48% and In: 52%, and the melting point of the No. 4 solder is 117° C. The No. 5 solder includes Sn: 40%, Bi: 56% and Zn: 4%, and the melting point of the No. 5 solder is 130° C. The No. 6 solder includes Sn: 43% and Bi: 57%, and the melting point of the No. 6 solder is 139° C.

The No. 7 solder includes In: 97% and Ag: 3%, and the melting point of the No. 7 solder is 143° C. The No. 8 solder includes In: 100%, and the melting point of the No. 8 solder is 156° C. The No. 9 solder includes Sn: 91% and Zn: 9%, and the melting point of the No. 9 solder is 199° C. The No. 10 solder includes In: 96.5% and Ag: 3.5%, and the melting point of the No. 10 solder is 221° C.

The melting point may be set by selecting the composition of the solder as illustrated above.

For example, it is assumed that solder having an identical composition is used for the soldering sheet 57 of the fuse 50, and the soldering bridge 64 and the soldering bump 68 of the fuse 60. In this case, the first temperature at which the soldering sheet 57 of the fuse 50 melts is equal to the second temperature at which the soldering bridge 64 and the soldering bump 68 of the fuse 60 melt.

When the temperatures of the soldering sheet 57, the soldering bridge 64, and the soldering bump 68 are lower than the respective melting points, the fuse 50 is electrically non-conductive, and the fuse 60 is electrically conductive. Hence, when the RFID tag 100 is read by the reader device, the reader device is able to read the identifier (ID) of the IC chip 40; however, the reader device is unable to read the identifier (ID) of the IC chip 30.

Further, when the temperatures of the soldering sheet 57, the soldering bridge 64, and the soldering bump 68 are raised to the respective melting points or above, the fuse 50 is electrically conductive, and the fuse 60 is electrically non-conductive. Hence, when the RFID tag 100 is read by the reader device, the reader device is able to read the identifier (ID) of the IC chip 30; however, the reader device is unable to read the identifier (ID) of the IC chip 40.

As described above, the RFID tag 100 includes the fuse 50 that is electrically conductive by its temperature rise and the fuse 60 that is electrically non-conductive by its temperature rise, and is configured to have equal switching temperatures of the fuse 50 and the fuse 60 being switched either to an electrically conductive mode or to an electrically non-conductive mode. When such an RFID tag is attached to an article or the like, the temperature of the article reaching a certain temperature or above may be specified.

The above-described RFID tag may be extremely useful when attached to an article that needs to detect the temperature rise of the article. Moreover, usability of the RFID tag 100 rises when there is an increased number of such articles.

For example, an oxygen generator is attached to each of passenger seats in a passenger airplane. Since the oxygen generator is used only once, it may be necessary to check whether each of the oxygen generators is an unused one before a flight.

The oxygen generator is configured to generate oxygen by an exothermic chemical reaction. Hence, the temperature of the oxygen generator is raised to a certain temperature or above by heat generated due to the chemical reaction when the oxygen generator is used. The current oxygen generator has a tape designed to be cut off by generation of heat, and the tape is disposed within a transparent frame that may be observed from outside. Hence, a flight attendant or an operator checks whether the tape of each of the oxygen generators has been cut off with a naked eye, and a product number of a corresponding one of the oxygen generators with a barcode reader or the like during inspection before a flight. Accordingly, only several tens of minutes may be required for inspecting the oxygen generators.

For example, the RFID tag 100 of the first embodiment is attached to each of the oxygen generators, and the melting points are set such that the fuse 50 is configured to be switched to a conductive mode, and the fuse 60 is configured to be switched to a non-conductive mode by heat generated on activation of the oxygen generator. With this configuration, the flight attendant or operator may simply use the reader device to read each of the RFID tags while walking the passage of the passenger airplane to easily identify whether each of the oxygen generators is an unused one. Hence, an inspection work of the oxygen generators may be easily conducted within a short time.

In this case, as the identifier (ID) of the RFID tag 100 attached to each of the oxygen generators, a different identifier (ID) may be assigned to each of the IC chip 30 and IC chip 40 for all the RFID tags 100 attached to the oxygen generators. Alternatively, an identical identifier (ID) may be assigned to the IC chips 30 of all the RFID tags 100, and an identical identifier (ID) may be assigned to the IC chips 40 of all the RFID tags 100. In this case, the identical identifier (ID) assigned to all the IC chips 30 may simply be differentiated from the identical identifier (ID) assigned to all the IC chips 40.

Further, when the RFID tags 100 are attached to each of a large number of articles, as the above-described oxygen generators, an anti-collision function is added to each of the RFID tags 100 and the reader device. A large number of RFID tags 100 may be read simultaneously owing to the anti-collision function.

As described above, articles having the temperatures reaching the first temperature may be specified by utilizing the RFID tags 100 of the first embodiment. This is because the identifier (ID) of the IC chip 30 may be read when the temperature rises to cause the fuse 50 to be electrically conductive.

The related art technology, for example, uses an active RFID tag incorporating a battery and memory to manage the temperature rise by storing information indicating the temperature rise. However, the active RFID tag incorporating a battery has the upper temperature limitation for use in the battery, which only allows the management of the temperature rise in a relatively low temperature range. In addition, the production cost of the active RFID tag is relatively high.

By contrast, the RFID tag 100 of the first embodiment is a passive RFID tag that includes no battery. Hence, the RFID tag 100 of the first embodiment may be attached to various types of articles without having the upper temperature limitation for use in the battery so as to specify the articles that exhibit the temperature rise. Further, since the RFID tag 100 of the first embodiment is a passive RFID tag, the production cost may be suppressed.

Moreover, in the related art RFID tag utilizing a temperature fuse, the temperature rise causes the temperature fuse to melt. Hence, the related art RFID tag is unable to be read by the reader-writer device once the temperature of the RFID tag has risen. Thus, it appears to be difficult to determine whether the ID being undetectable is caused by blowout of the temperature fuse due to the temperature rise or caused by the breakage or the like of the RFID tag.

By contrast, in the RFID tag 100 of the first embodiment, the fuse 50 is electrically non-conductive before the temperature rise, such that the ID of the IC chip 40 is capable of being read by the reader device. Hence, it may be possible to specify the temperature rise.

Further, in the RFID tag 100 of the first embodiment, the fuse 50 is electrically conductive and the fuse 60 is electrically non-conductive after the temperature rise, such that the ID of the IC chip 30 is capable of being read by the reader device.

Accordingly, it may be possible to specify which RFID tags are attached to the articles that have exhibited the temperature rise by switching between the IDs (between ID of IC chip 30 and ID of IC chip 40 in this case) that are readable by the reader device when the temperature rise occurs.

Note that the RFID tag 100 of the first embodiment is not necessarily constantly read by the reader device. The RFID tags 100 of the first embodiment attached to each of the articles may be read at irregular intervals; however, it is still possible to detect the articles that exhibit the temperature rise.

The above description is given of the example that employs solder having an identical composition is used for the soldering sheet 57 of the fuse 50, and the soldering bridge 64 and the soldering bump 68 of the fuse 60. However, it possible to employ solder having different compositions for the soldering sheet 57 of the fuse 50, and the soldering bridge 64 and the soldering bump 68 of the fuse 60.

For example, solder having different compositions may be used for the soldering sheet 57 of the fuse 50, and the soldering bridge 64 and the soldering bump 68 of the fuse 60 so as to set the melting point (first temperature) of the soldering sheet 57 to be higher than the melting point (second temperature) of the soldering bridge 64 and the soldering bump 68.

For example, in the production process for producing articles with heating, the RFID tags 100 are attached to each of the articles, and the IDs of the RFID tags 100 are configured to be constantly read by the reader device. For example, the soldering sheet 57 of the fuse 50 is formed of the No. 9 solder (melting point: 199° C.), and the soldering bridge 64 and the soldering bump 68 of the fuse 60 are formed of the No. 5 solder (melting point: 130° C.).

In this case, the ID of the IC chip 40 becomes not readable when the fuse 60 of the RFID tag 100 attached to each of the articles has become non-conductive, which indicates that the temperature of the article has reached 130° C.

In addition, the ID of the IC chip 30 becomes readable when the fuse 50 of the RFID tag 100 attached to each of the articles has become conductive, which indicates that the temperature of the article has reached 199° C.

Hence, in a case where the above-described RFID tags 100 are used in the production process for producing articles with heating, it may be possible to detect when the first or the second temperature has been reached, in which process the first or the second temperature has been reached, or a period of time that is required for increasing a temperature from the second temperature to the first temperature.

The above-described RFID tag 100 may be widely used in a production process of a semiconductor device with heating, a production process of resin molded articles with heating, a production process of food with heating, and the like.

Note that in a case where the melting point (first temperature) of the soldering sheet 57 is set to be higher than the melting point (second temperature) of the soldering bridge 64 and the soldering bump, any combination of the first temperature and the second temperature may be set according to communications. For example, when there is a relatively small difference between the first temperature and the second temperature, it is possible to detect that a small temperature change has occurred. For example, when there is a relatively small difference between the first temperature and the second temperature, it is possible to detect that a small temperature change has occurred.

Note that illustration is given above of the melting point of the soldering sheet 57 of the fuse 50 and the melting point of the soldering bridge 64 and the soldering bump 68 of the fuse 60. In this case, the solder having an identical composition with the soldering sheet 57 may be used as the solders 53A1 and 53B1 of the fuse 50.

Further, the solder having an identical composition with the soldering bridge 64 and the soldering bump 68 may be used as the solder 63A, 65A1, 65B1, and 69A of the fuse 60.

Note that solder having a melting point lower than that of the soldering sheet 57 may be used as the solders 53A1 and 53B1 of the fuse 50. Similarly, the solder having a melting point lower than that of the soldering bridge 64 and the soldering bump 68 may be used as the solder 63A, 65A1, 65B1, and 69A of the fuse 60.

Next, a description is given, with reference to FIGS. 8 to 18, of a production method of the RFID tag 100 of the first embodiment.

FIGS. 8 to 18 each illustrate a stepwise diagram illustrating a production process of the RFID tag 100 of the first embodiment.

In the following, illustration is given of an example of the production process. In this production process, hole parts 70A and 70B are initially formed in the substrate 10, the IC chips 30 and 40 are then mounted on the substrate 10, and the fuses 50 and 60 are finally formed in this order.

However, the above-described order of the production process is merely an example. Alternatively, the IC chips 30 and 40 may initially be mounted on the substrate, the hole parts 70A and 70B may then be formed in the substrate, and the fuses 50 and 60 may be finally formed in this order. Further, the fuse 60 may be formed before the fuse 50, or the IC chips 30 and 40 may be mounted on the substrate 10 after the fuses 50 and 60 are formed.

Figure 8:
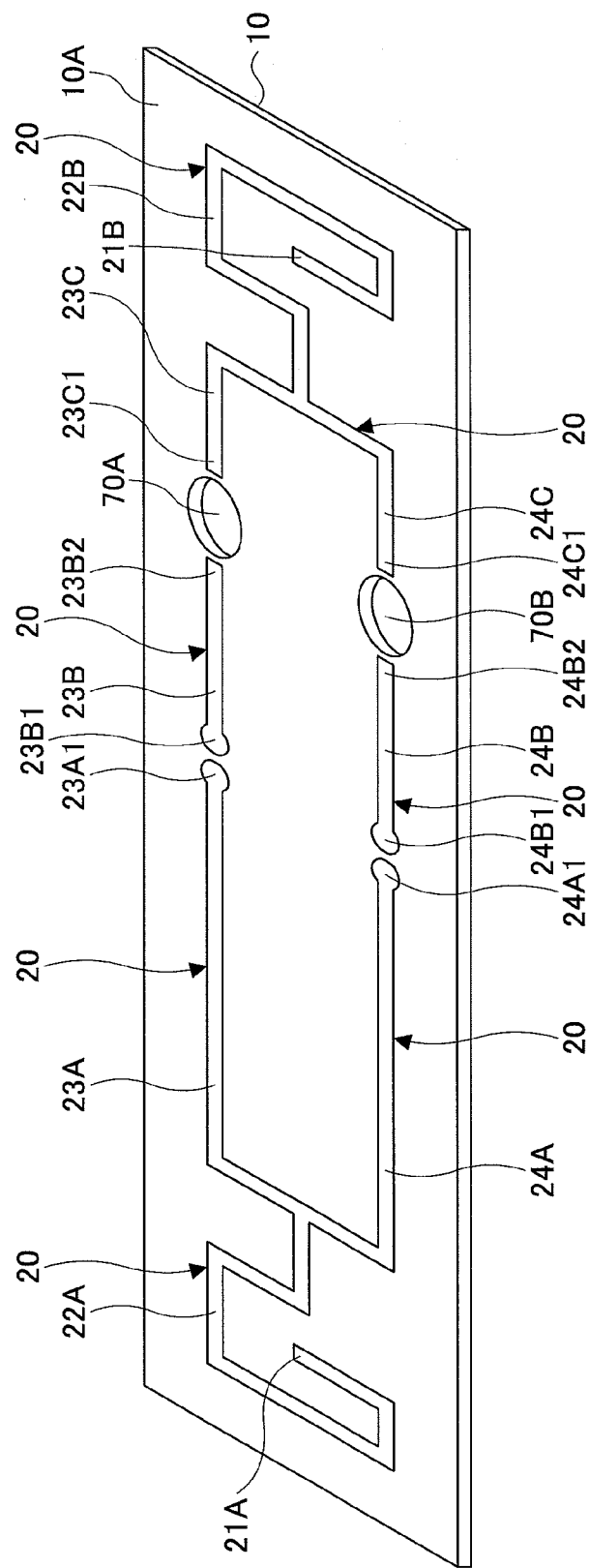
FIG. 8 is a stepwise diagram illustrating a production process of the RFID tag 100 according to the first embodiment.

Initially, as illustrated in FIG. 8, the hole parts 70A and 70B are formed on the antenna 20 patterned substrate 10. The hole part 70A is formed between the terminal 23B2 of the antenna part 23B and the terminal 23C1 of the antenna part 23C. The hole part 70B is formed between the terminal 24B2 of the antenna part 24B and the terminal 24C1 of the antenna part 24C.

Note that the antenna part 23B and the antenna part 23C may be integrally formed in advance, and may thereafter be divided into the antenna part 23B and the antenna part 23C by forming the hole part 70A. Similarly, the antenna part 24B and the antenna part 24C may be integrally formed in advance, and may thereafter be divided into the antenna part 24B and the antenna part 24C by forming the hole part 70B.

In a case of the substrate 10 being made of PET, the hole parts 70A and 70B may be formed by a punching process. In a case of the substrate 10 being made of glass epoxy resin, the hole parts 70A and 70B may be formed by a laser process or a drilling process. Note that in this example, the hole parts 70A and 70B are simultaneously formed; however, the hole part 70B may be formed after the fuse 50 is formed.

Figure 9:
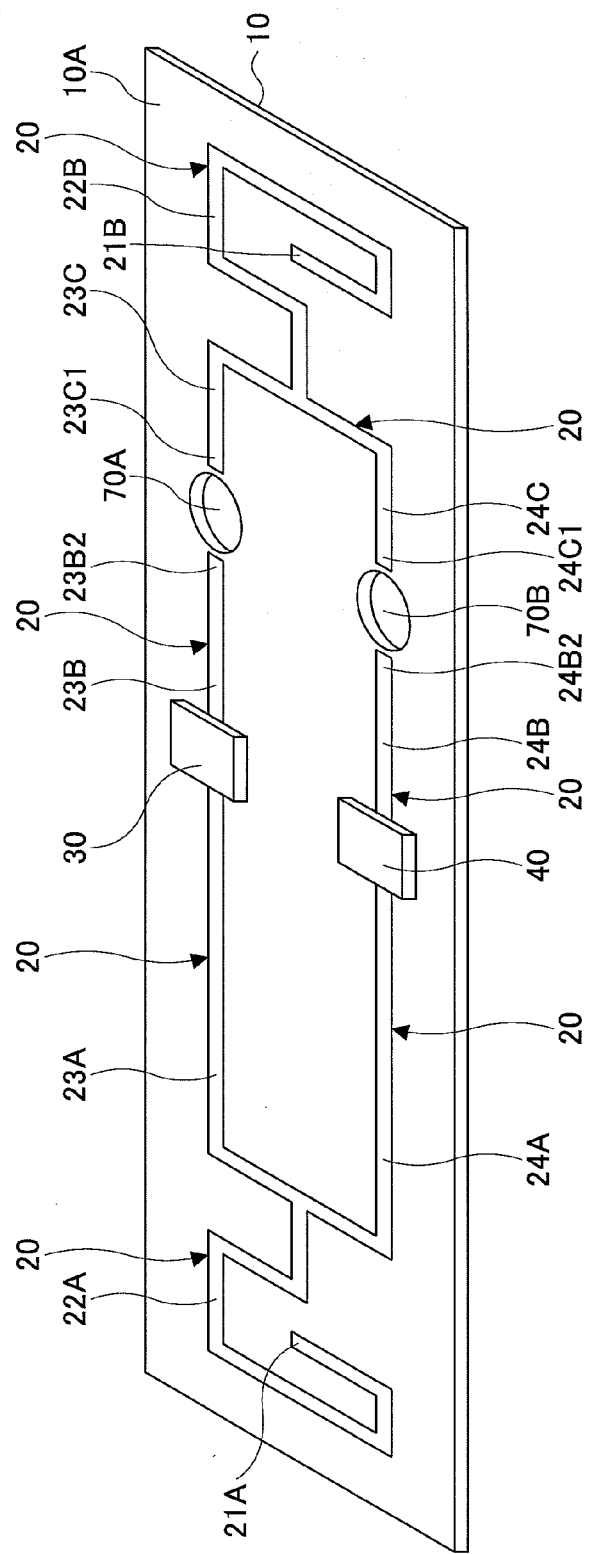
FIG. 9 is a stepwise diagram illustrating a production process of the RFID tag 100 according to the first embodiment.

Next, the IC chips 30 and 40 are flip-chip mounted on the substrate 10 as illustrated in FIG. 9. Hence, the IC chip 30 is connected to the antenna parts 23A and 23B, and the IC chip 40 is connected to the antenna parts 24A and 24B.

Respective bumps 31 and 32 are, as illustrated in FIG. 3A, connected to the terminal 23A1 of the antenna part 23A and the terminal 23B1 of the antenna part 23B with solder while being fixed with underfill resin, such that the IC chip 30 is flip-chip mounted on the substrate 10.

Respective bumps 41 and 42 are, as illustrated in FIG. 5A, connected to the terminal 24A1 of the antenna part 24A and the terminal 24B1 of the antenna part 24B with solder while being fixed with underfill resin, such that the IC chip 40 is flip-chip mounted on the substrate 10.

Figure 10:
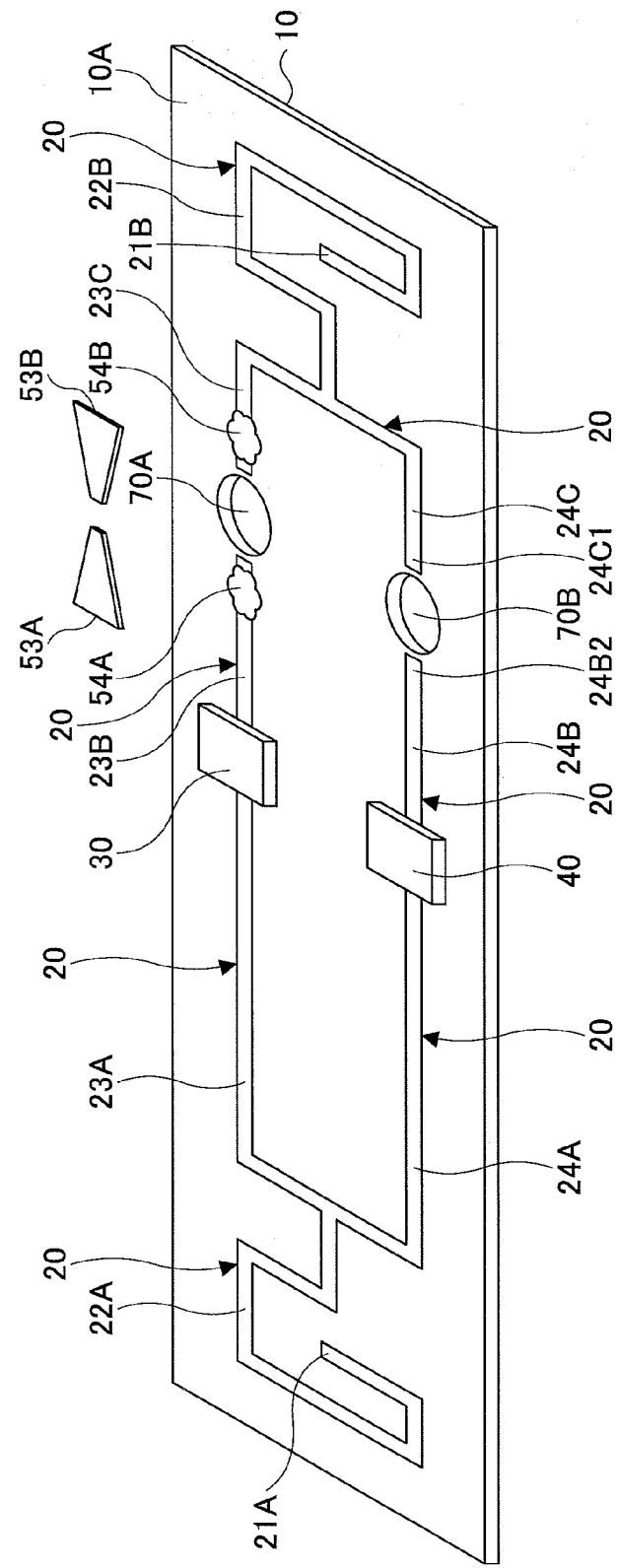
FIG. 10 is a stepwise diagram illustrating a production process of the RFID tag 100 according to the first embodiment.

Next, the electrically conductive adhesives 54A and 54B formed of silver paste are applied to the terminal 23B2 of the antenna part 23B and the terminal 23C1 of the antenna part 23C, respectively, as illustrated in FIG. 10.

Figure 11:
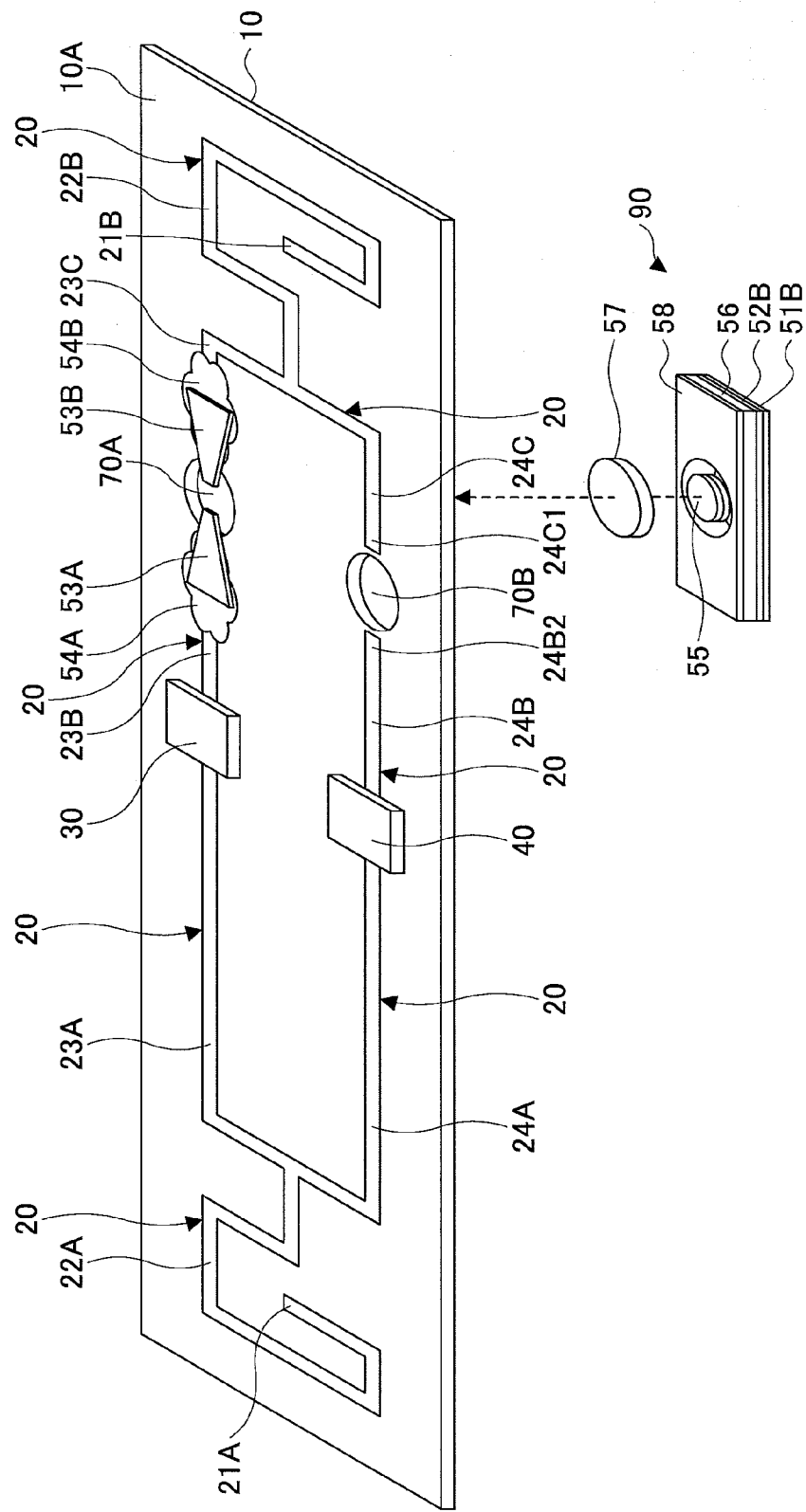
FIG. 11 is a stepwise diagram illustrating a production process of the RFID tag 100 according to the first embodiment.

Subsequently, the lands 53A and 53B are adhered to surfaces of the electrically conductive adhesives 54A and 54B, respectively, as illustrated in FIG. 11. The lands 53A and 53B may, for example, be compressively adhered to the electrically conductive adhesives 54A and 54B while being locally heated by a reflow process.

The respective lands 53A and 53B are adhered such that respective pointed ends 53A2 and 53B2 (see FIG. 3B) of the lands 53A and 53B2 are located above the hole part 70A in a planar view.

Further, at this time, a structure 90 is prepared in advance. The structure 90 is formed by adhering the double-faced adhesive tape 52B, the spacer 56, and the double-faced adhesive tape 58 in this order to the surface of the cover part 51B, while adhering the land 52C to the surface of the cover part 51B with the double-faced adhesive tape 52C (see FIG. 3A) within the hole part 56A of the spacer 56. The soldering sheet 57 is fitted into the hole part 56A of the spacer 56 of the structure 90. The soldering sheet 57 may, for example, is made of solder that is selected based on the compositions illustrated in FIG. 7. The melting point (first temperature) of the soldering sheet 57 is determined based on a composition of solder.

Note that in this example, the structure 90 that is prepared in advance is adhered to the substrate 10. However, alternatively, the double-faced adhesive tape 58, the spacer 56, the soldering sheet 57, the land 55, the double-faced adhesive tape 52B, and the cover part 51B may be sequentially adhered to a surface of the reversed substrate 10 in this order without preparing the structure 90.

Figure 12:
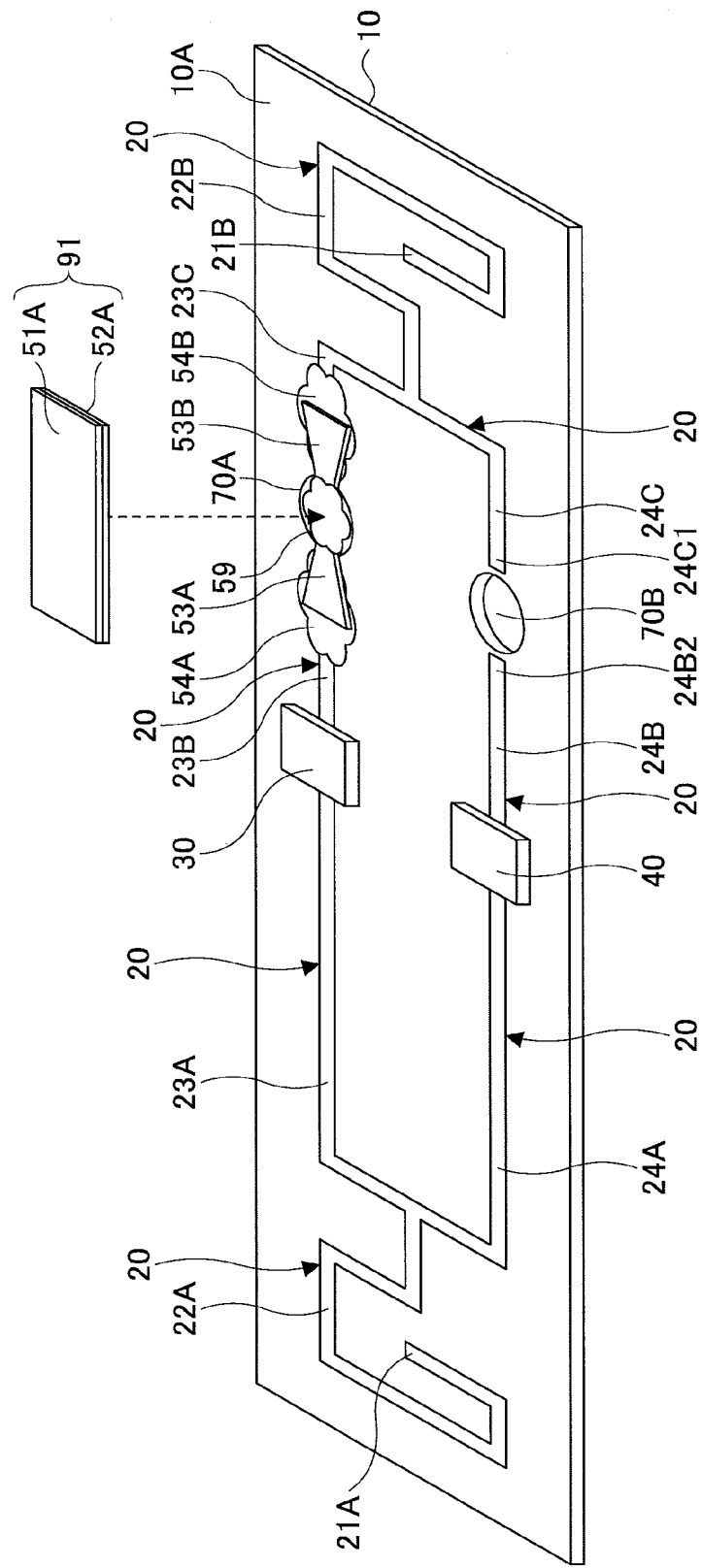
FIG. 12 is a stepwise diagram illustrating a production process of the RFID tag 100 according to the first embodiment.

Next, the structure 90 is adhered to a lower surface of the substrate 10 (see FIG. 11), and the flux 59 is injected into the hole part 70 from an upper side of the hole part 70A as illustrated in FIG. 12. Thus, the flux 59 is accommodated within the hole part 70A at a position above the soldering sheet 57, as illustrated in FIG. 3A.

Further, at this time, a structure 91 in which the double-faced adhesive tape 52A is adhered to the lower surface of the cover part 51A is prepared in advance. Note that in this example, the structure 91 is prepared in advance, which is then attached to the surface 10A of the substrate 10. However, alternatively, the double-faced adhesive tape 52A and the cover part 51A may be sequentially adhered to the surface 10A of the reversed substrate 10 in this order without preparing the structure 91.

Figure 13:
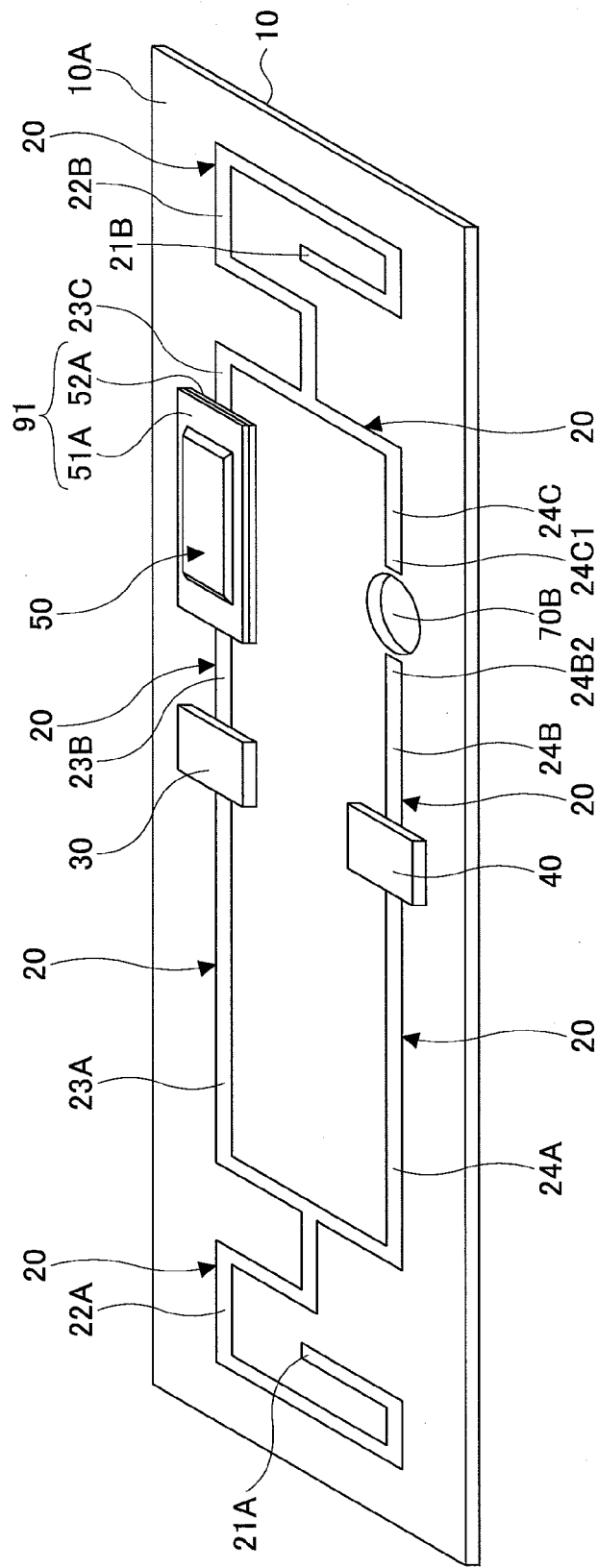
FIG. 13 is a stepwise diagram illustrating a production process of the RFID tag 100 according to the first embodiment.

Next, the structure 91 in which the double-faced adhesive tape 52A is adhered to the lower surface of the cover part 51A is adhered to the surface 10A of the substrate 10, and the lands 53A and 53B, the electrically conductive adhesives 54A and 54B, the hole part 70A, and the flux 59 are then covered with the cover part 51A, as illustrated in FIG. 13. The fuse 50 is completed as described above.

Figure 14:
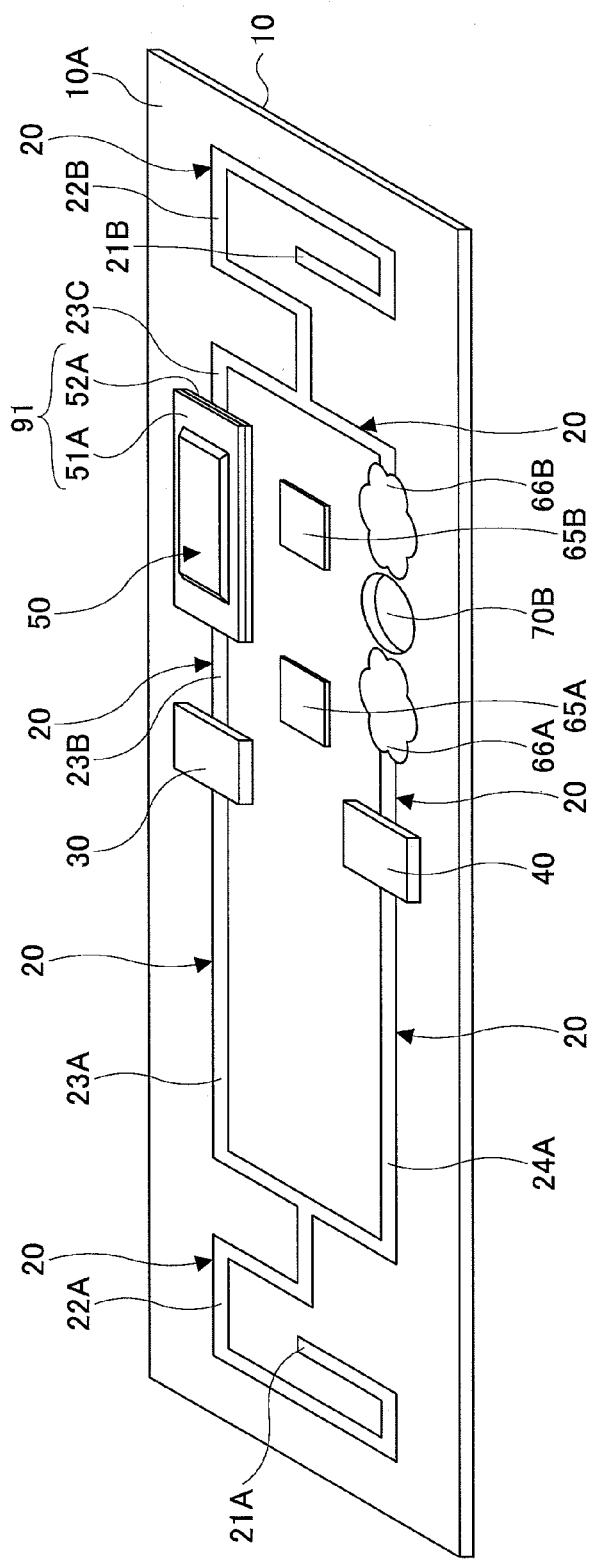
FIG. 14 is a stepwise diagram illustrating a production process of the RFID tag 100 according to the first embodiment.

Next, the electrically conductive adhesives 66A and 66B formed of silver paste are applied to the terminal 24B2 of the antenna part 24B and the terminal 24C1 of the antenna part 24C, respectively, as illustrated in FIG. 14.

Figure 15:
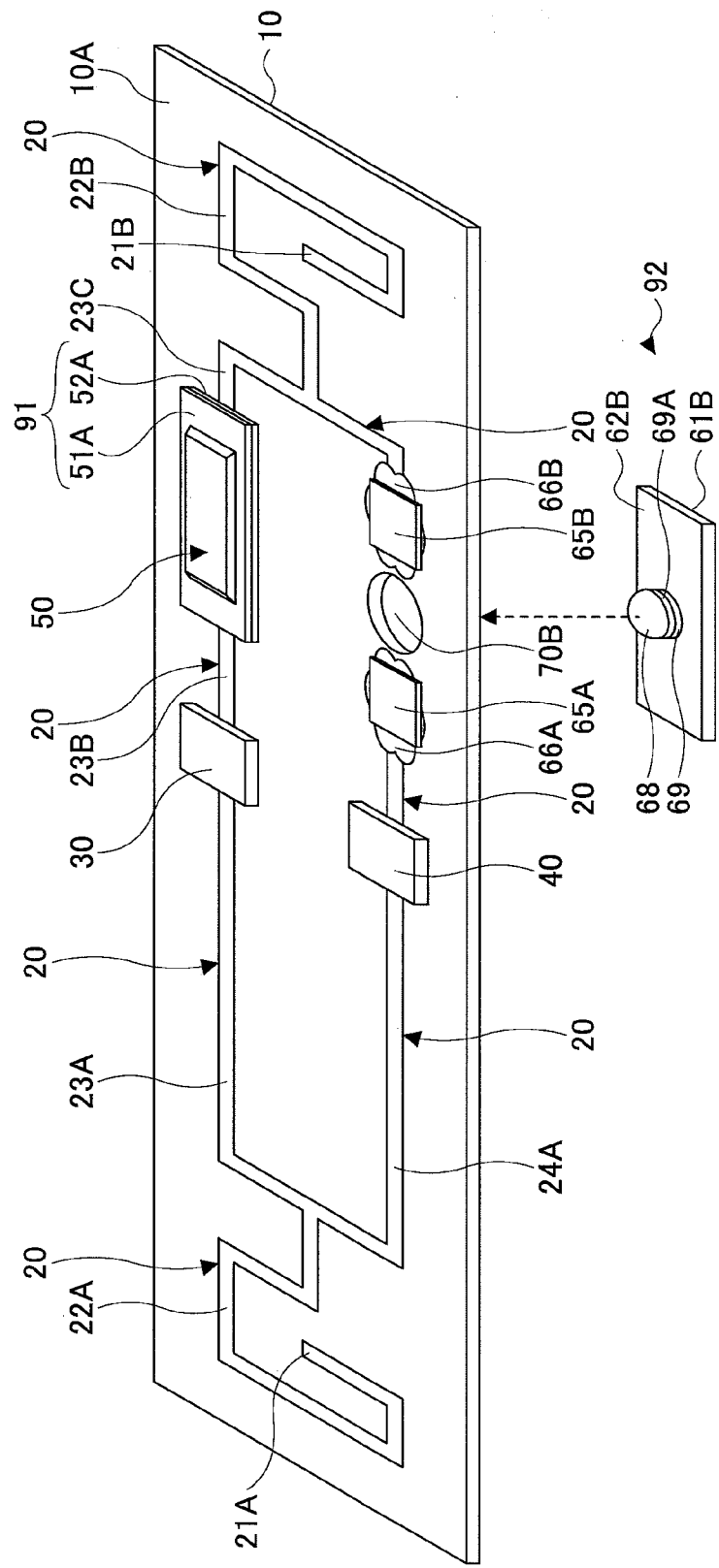
FIG. 15 is a stepwise diagram illustrating a production process of the RFID tag 100 according to the first embodiment.

Subsequently, the lands 65A and 65B are adhered to surfaces of the electrically conductive adhesives 66A and 66B, respectively, as illustrated in FIG. 15. The lands 65A and 65B may, for example, be compressively adhered to the electrically conductive adhesives 66A and 66B while being locally heated by a reflow process.

At this time, a structure 92 is prepared in advance. The structure 92 is formed by adhering the double-faced adhesive tape 62 to the upper surface of the cover part 61A while adhering a layered product of the soldering bump 68 and the land 69 in the center of the upper surface of the double-faced adhesive tape 62.

Note that in this example, the structure 92 is prepared in advance. However, alternatively, the soldering bump 68, the land 69, the double-faced adhesive tape 62B, and the cover part 61A may be sequentially adhered to a surface of the reversed substrate 10 in this order without preparing the structure 92.

Next, the structure 92 (see FIG. 15) is attached to the lower surface of the substrate 10 as illustrated in FIG. 15. The structure 92 is adhered to the lower surface of the substrate 10 with the double-faced adhesive tape 62B.

Figure 16:
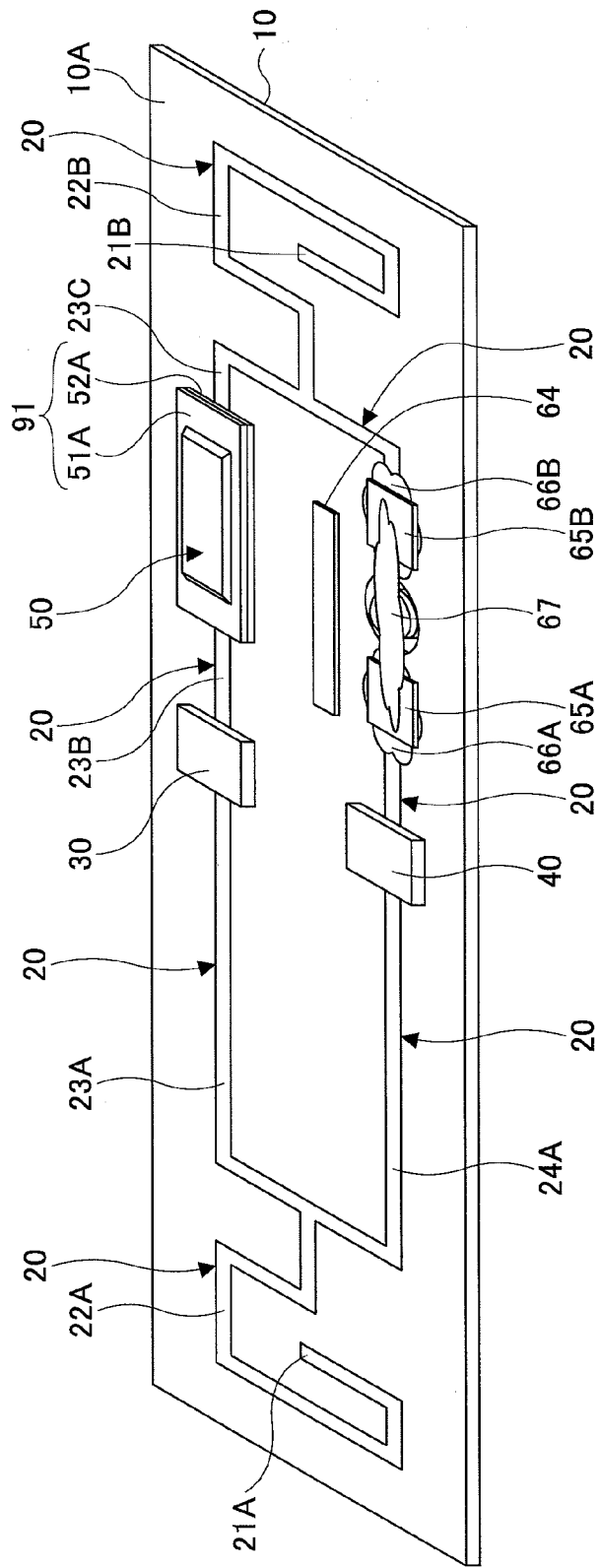
FIG. 16 is a stepwise diagram illustrating a production process of the RFID tag 100 according to the first embodiment.

Further, in FIG. 16, the flux 67 is applied to the upper part and in the periphery of the soldering bump 68 that is projected from the hole part 70B. The flux 67 is extendedly applied to respective upper parts of the lands 65A and 65B.

Note that the soldering bridge 64 and the soldering bump 68 may be formed, in advance, of solder having a composition identical to that of the soldering sheet 57.

Figure 17:
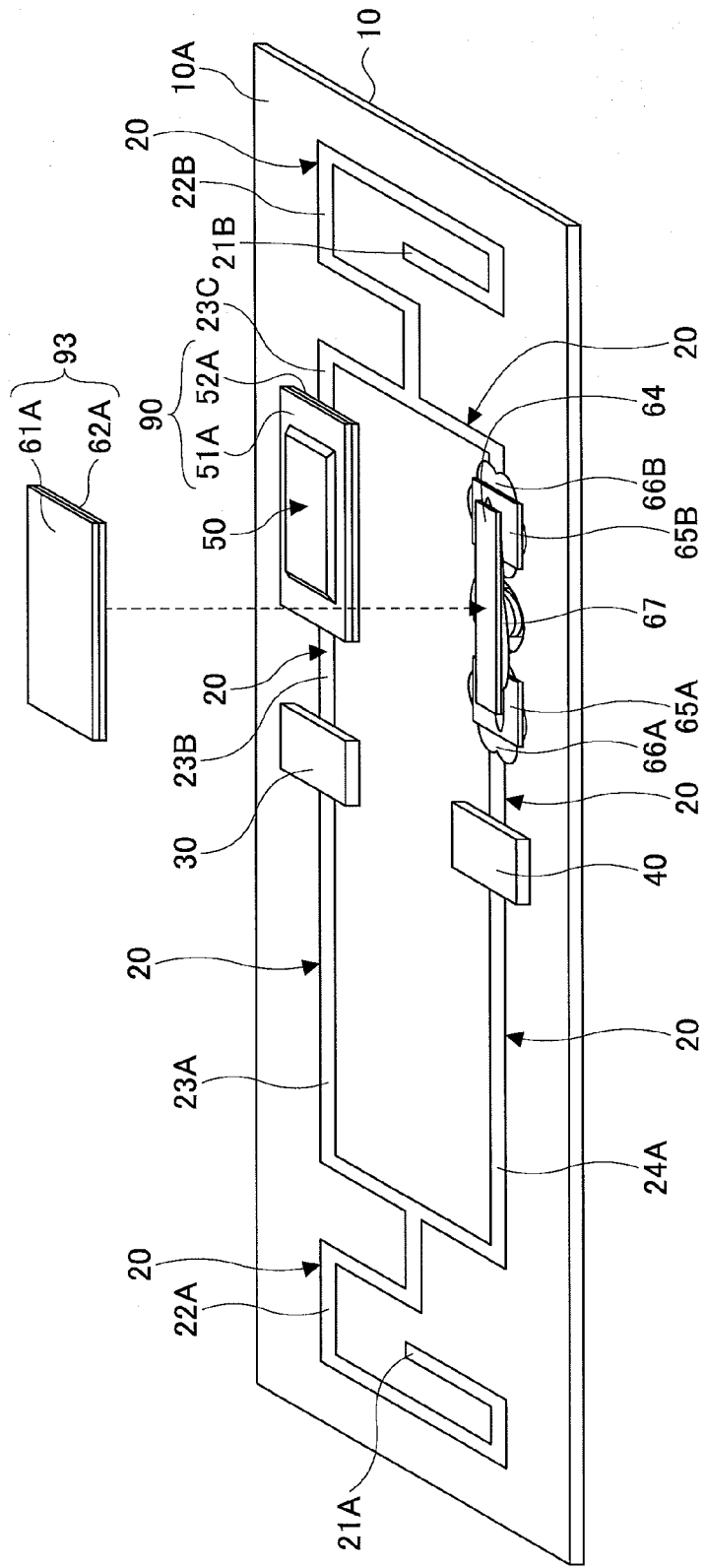
FIG. 17 is a stepwise diagram illustrating a production process of the RFID tag 100 according to the first embodiment.

Next, the partially heated soldering bridge 64 is connected to the respective upper surfaces of the lands 65A and 65B, as illustrated in FIG. 17.

At this time, a structure 93 is prepared in advance. The structure 93 is formed by adhering the double-faced adhesive tape 62A to the lower surface of the cover part 61A, while adhering the land 63 to the lower surface of the cover part 61A with the double-faced adhesive tape 62C within the hole part 62A1 of the double-faced adhesive tape 62A.

Note that in this example, the structure 92 is prepared in advance. However, alternatively, the land 63, the double-faced adhesive tape 63C, the double-faced adhesive tape 62A, and the cover part 61A may be sequentially adhered in this order without preparing the structure 93.

Figure 18:
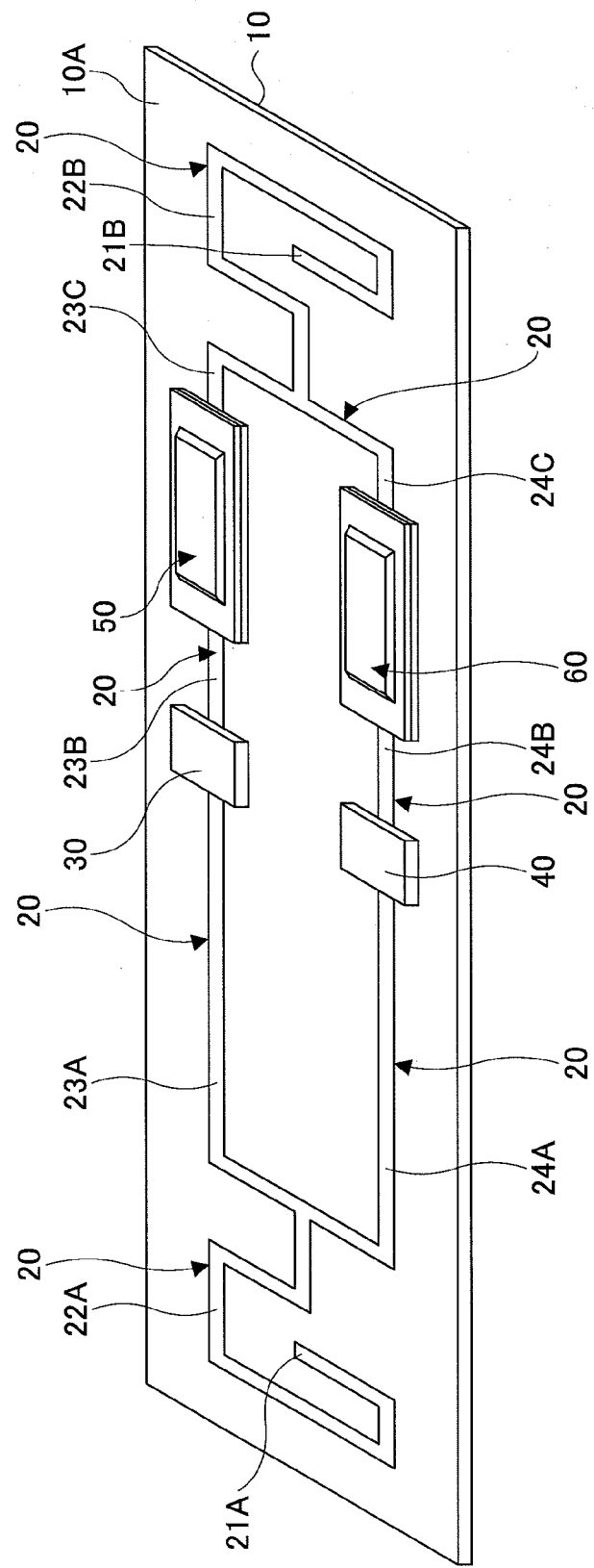
FIG. 18 is a stepwise diagram illustrating a production process of the RFID tag 100 according to the first embodiment.

Next, the structure 93 (see FIG. 17) is adhered to the surface 10A of the substrate 10 as illustrated in FIG. 18. The structure 93 is adhered to the surface 10A of the substrate 10 with the double-faced adhesive tape 62A. Hence, the soldering bridge 64, the lands 65A and 65B, the electrically conductive adhesives 66A and 66B, the flux 67, the soldering bump 68, and the hole part 70B are covered with the cover part 61A. The fuse 60 is completed as described above.

The RFID tag 100 of the first embodiment is thus completed according to the above-described production process.

According to the first embodiment, an article exhibiting a certain temperature or above may be detected by attaching the RFID tag 100 to the article, the RFID tag including the fuse 50 that has become electrically conductive with heating, and the fuse 60 that has become electrically non-conductive with heating.

Note that in the first embodiment, illustration is given of the RFID tag 100 including the dipole antenna 20 (see FIGS. 1B and 2) having the rectangular coil-like antenna parts 22A and 22B in a planar view that are disposed on opposite ends of the antenna 20. However, the pattern of the antenna 20 is not limited to such a pattern.

Figure 19A:
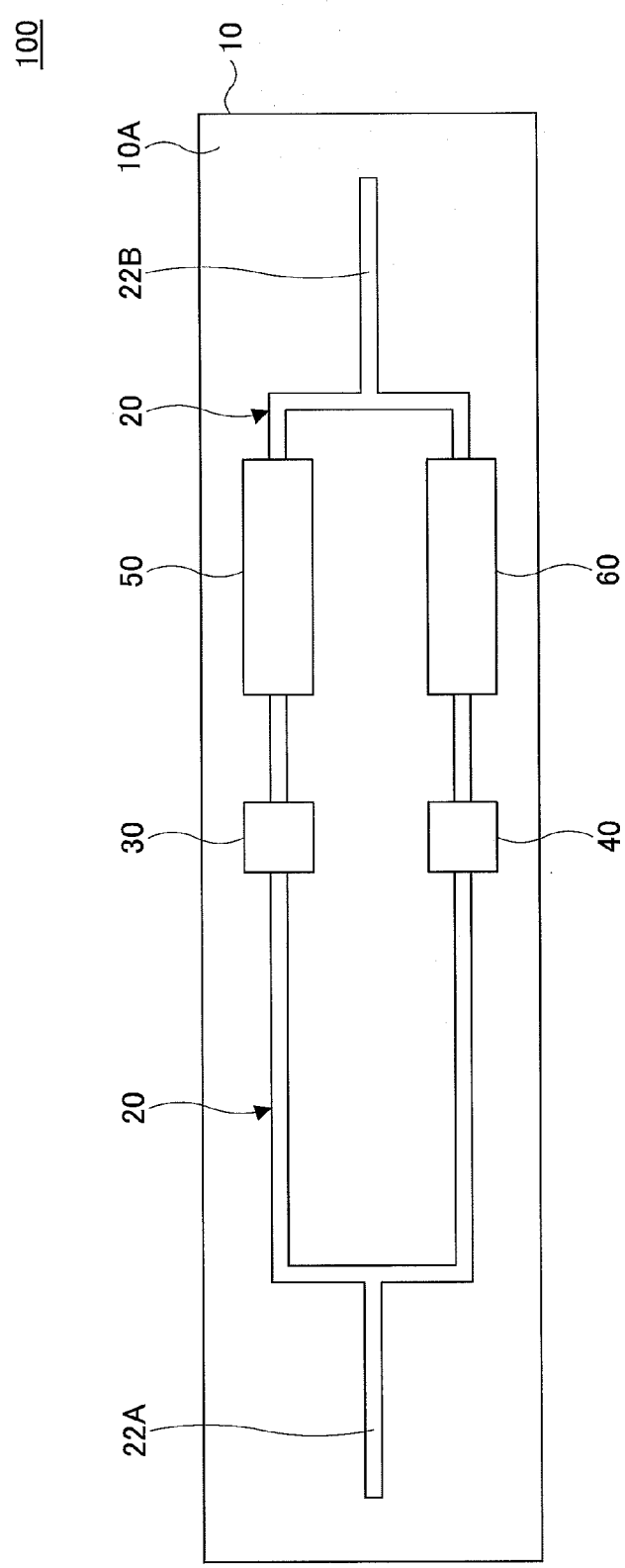
FIG. 19A is a diagram illustrating modification of the antenna pattern of the RFID tag 100 according to the first embodiment.

For example, the antenna parts 22A and 22B may each have straight line shapes as illustrated in FIG. 19A. Further, the antenna parts 22A and 22B illustrated in FIG. 19A may be connected to form a modified loop-like antenna part 22 illustrated in FIG. 19B.

Further, in the first embodiment, illustration is given of a configuration in which the fuses 50 and 60 are inserted in series on a substrate on which the antenna 20 is patterned. However, the fuses 50 and 60 may be inserted between the IC chip 30 and the antenna 20 and between the IC chip 40 and the antenna 20, respectively.

Figure 20:
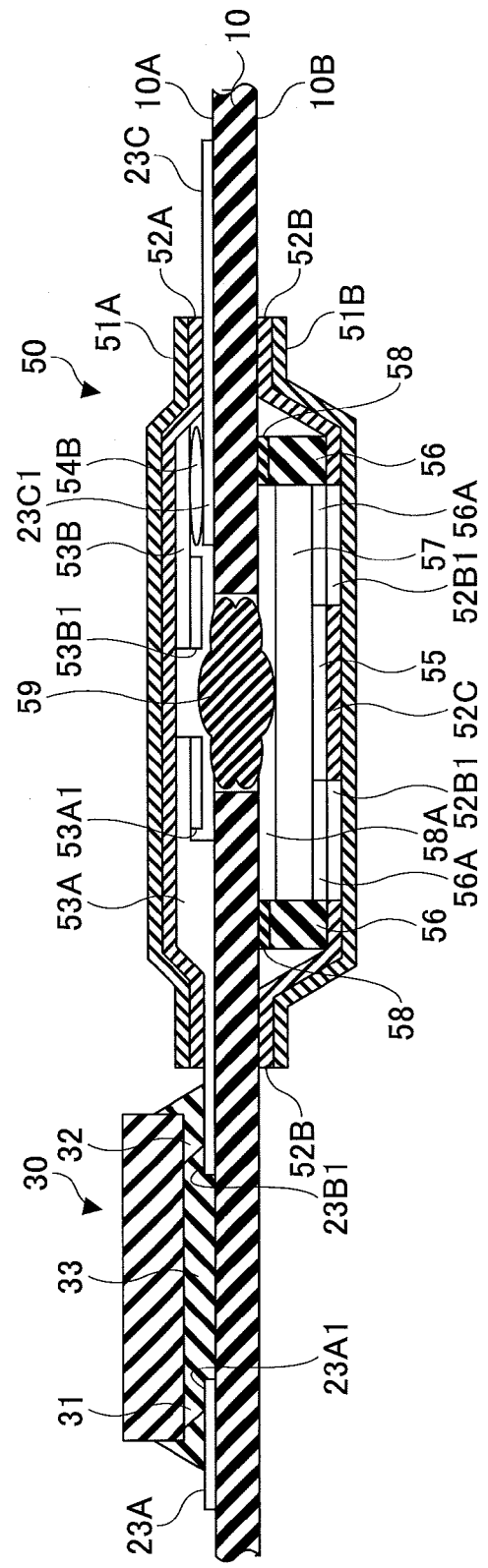
FIG. 20 is a cross-sectional diagram illustrating modification of the RFID 100 according to the first embodiment including the IC chip 30 and the fuse 50.

For example, the fuse 50 may be inserted between the antenna 20 and one of the bumps 31 and 32 of the IC chip 30, and the fuse 60 may be inserted between the antenna 20 and one of the bumps 41 and 42 of the IC chip 40. Specifically, the bump 31 or 32 of the IC chip 30 may be connected to one of the lands 53A and 53B of the fuse 50, and the other one of the lands 53A and 53B of the fuse 50 may be connected to the antenna 20. Similarly, the bump 41 or 42 of the IC chip 40 may be connected to one of the lands 65A and 65B of the fuse 60, and the other one of the lands 65A and 65B of the fuse 60 may be connected to the antenna 20. Of these configurations, a cross-sectional structure in which the land 53A of the fuse 50 is directly connected to the bump 32 of the IC chip 30 is illustrated in FIG. 20. FIG. 20 is a cross-sectional diagram illustrating modification of the RFID tag 100 according to the first embodiment including the IC chip 30 and the fuse 50. The land 53A of the fuse 50 illustrated in FIG. 20 extends from the left end of the cover part 51A and the double-faced adhesive tape 52A toward the IC chip 30, and is directly connected to the bump 32. With this configuration, the fuse 50 may be inserted between the IC chip 30 and the antenna part 23C.

Further, respective wires may be drawn between the antenna 20 and one of the bumps 31 and 32 of the IC chip 30, and between the antenna 20 and one of the bumps 41 and 42 of the IC chip 40, and the fuses 50 and 60 may be inserted into the respective wires.

Second Embodiment

Figure 21:
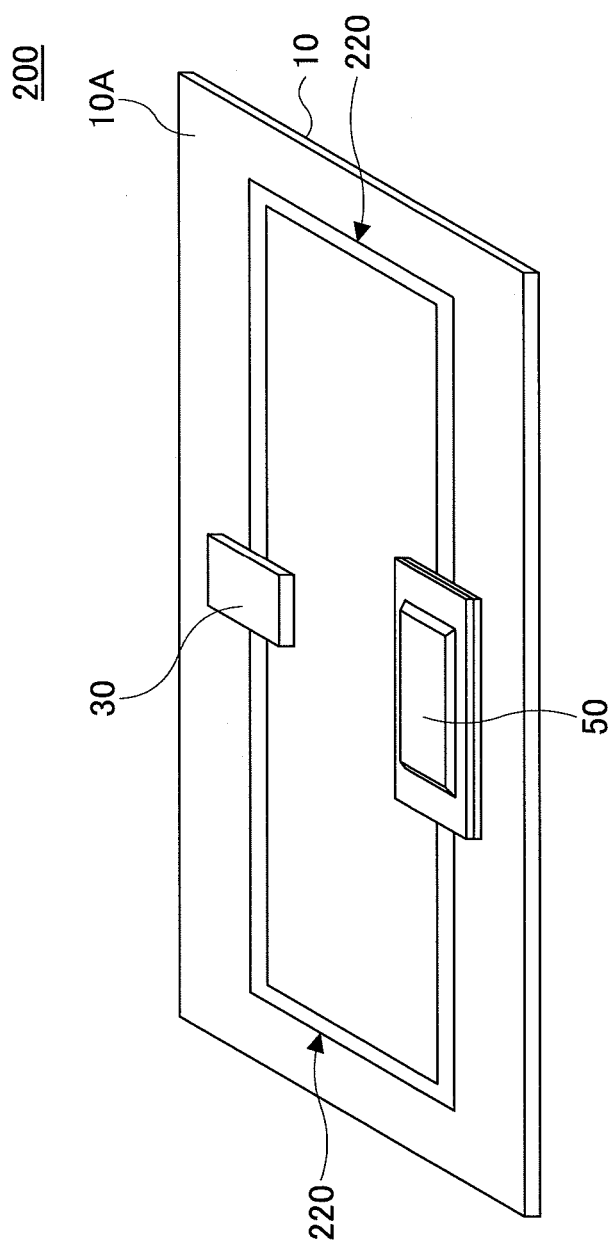
FIG. 21 is a perspective diagram illustrating an RFID tag 200 according to a second embodiment.
Figure 22:
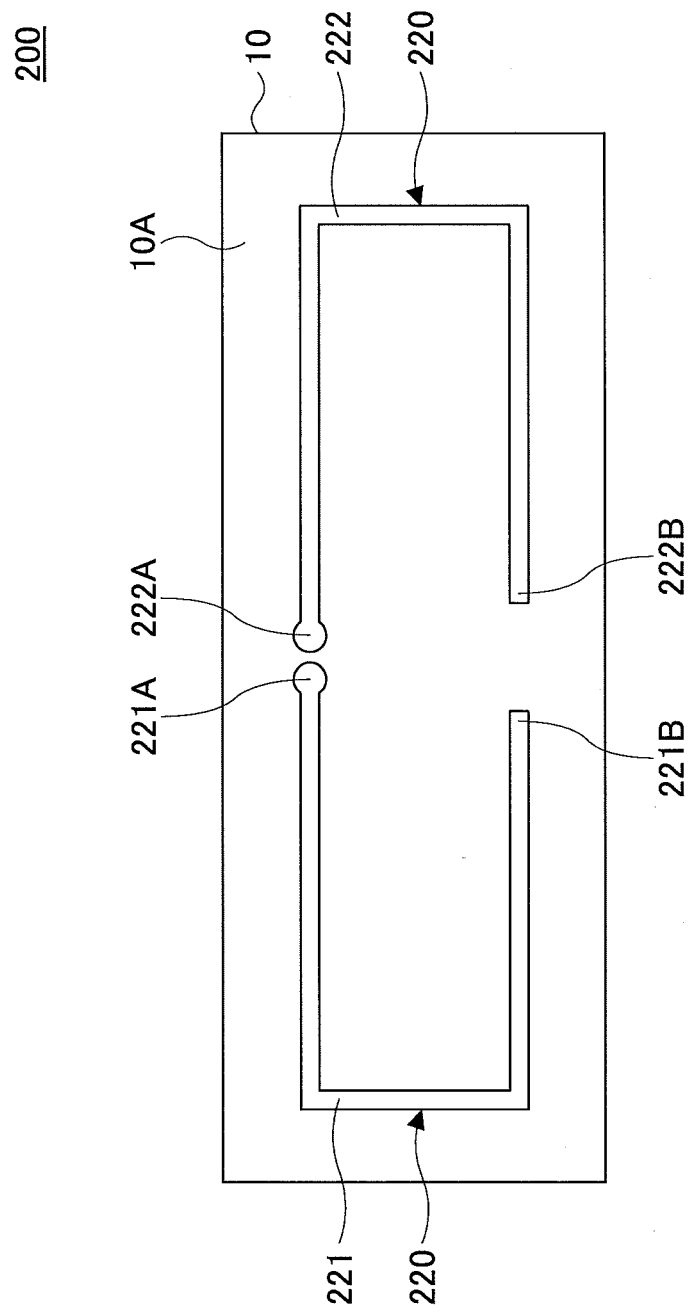
FIG. 22 is a diagram illustrating an antenna pattern of the RFID tag 200 according to the second embodiment.

FIG. 21 is a perspective diagram illustrating an RFID tag 200 according to a second embodiment. FIG. 22 is a diagram illustrating an antenna pattern of the RFID tag 200 according to the second embodiment.

The RFID tan 200 of the second embodiment differs from the RFID tag 100 of the first embodiment in that the RFID tag 200 of the second embodiment does not include the IC chip 40 and the fuse 60. Since other elements of the RFID tag 200 of the second embodiment are the same as or equivalent to those of the RFID tag 100 of the first embodiment, those elements of the RFID tag 200 of the second embodiment that are the same as or equivalent to those of the RFID tag 100 of the first embodiment are designated by the same reference numerals, and a duplicated description is omitted.

The RFID tag 200 of the second embodiment includes the substrate 10, an antenna 220, the IC chip 30, and the fuse 50.

The antenna 220 may, for example, be formed of silver paste, aluminum foil, or copper foil in a manner similar to the antenna 20 of the RFID tag of the first embodiment. In a case of the antenna 220 being formed of silver paste, silver paste may be screen-printed on the surface 10A of the substrate 10. In a case of the antenna 220 being formed of aluminum foil or copper foil, aluminum foil or copper foil formed on the surface 10A of the substrate 10 may be etched.

The antenna 220 is a loop-like antenna, and includes an antenna part 221 and an antenna part 222. The antenna parts 221 and 222 are each patterned in U-shapes in a planar view.

The antenna part 221 includes a terminal 221A configured to be connected with the bump 31 of the IC chip 30 (see FIG. 3A), and a terminal 221B to which the land 53A of the fuse 50 is adhered with the electrically conductive adhesive 54A (see FIGS. 3A and 3B). The terminal 221A and the terminal 221B are disposed on opposite ends of the antenna part 221.

The antenna part 222 includes a terminal 222A configured to be connected with the bump 32 of the IC chip 30 (see FIG. 3A), and a terminal 222B to which the land 53B of the fuse 50 is adhered with the electrically conductive adhesive 54B (see FIGS. 3A and 3B). The terminal 222A and the terminal 222B are disposed on opposite ends of the antenna part 222.

The IC chip 30 is flip-chip mounted on the terminals 221A and 222A in a manner similar to the RFID tag 100 of the first embodiment.

The fuse 50 in the second embodiment is formed in a manner similar to the fuse 50 in the first embodiment as follows. The hole part 70A (see FIG. 8) is formed in the substrate 10 between the terminal 221B and the terminal 222B, and the lands 53A and 53B are then adhered to the terminals 221B and 222B via the electrically conductive adhesives 54A and 54B (see FIGS. 3A and 3B).

In the RFID tag 200 of the second embodiment having such a configuration, when the temperature of the soldering sheet 57 of the fuse 50 (see FIGS. 3A and 3B) has reached the melting point (first temperature) or above to cause the soldering sheet 57 of the fuse 50 to melt, the fuse 50 has become electrically conductive. Hence, the identifier (ID) of the RFID tag 200 may become readable by the reader device.

Accordingly, it is possible to determine that the temperature of the article has reached a certain temperature when the RFID tag 200 is attached to the article subject to the temperature rise, and the RFID tag 200 has become readable by the temperature rise of the article.

Hence, it is possible to identify articles having their temperatures reaching the first temperature by utilizing the RFID tags 200 of the second embodiment.

Note that the melting point (first temperature) of the soldering sheet 57 of the fuse 50 may be set by selecting compositions of solder based on the communications of the RFID tag 200.

The above-described RFID tag 200 may be widely used for managing temperatures of articles in a production process of a semiconductor device with heating, a production process of resin molded articles with heating, a production process of food with heating, and the like. Further, it is possible to manage whether heat resistant articles have reached an upper threshold of a temperature of the heat resistant articles by setting the melting point of the soldering sheet 57 such that the fuse 50 becomes electrically conductive at the upper threshold of the temperature of the heat-resistant articles.

Third Embodiment

Figure 23:
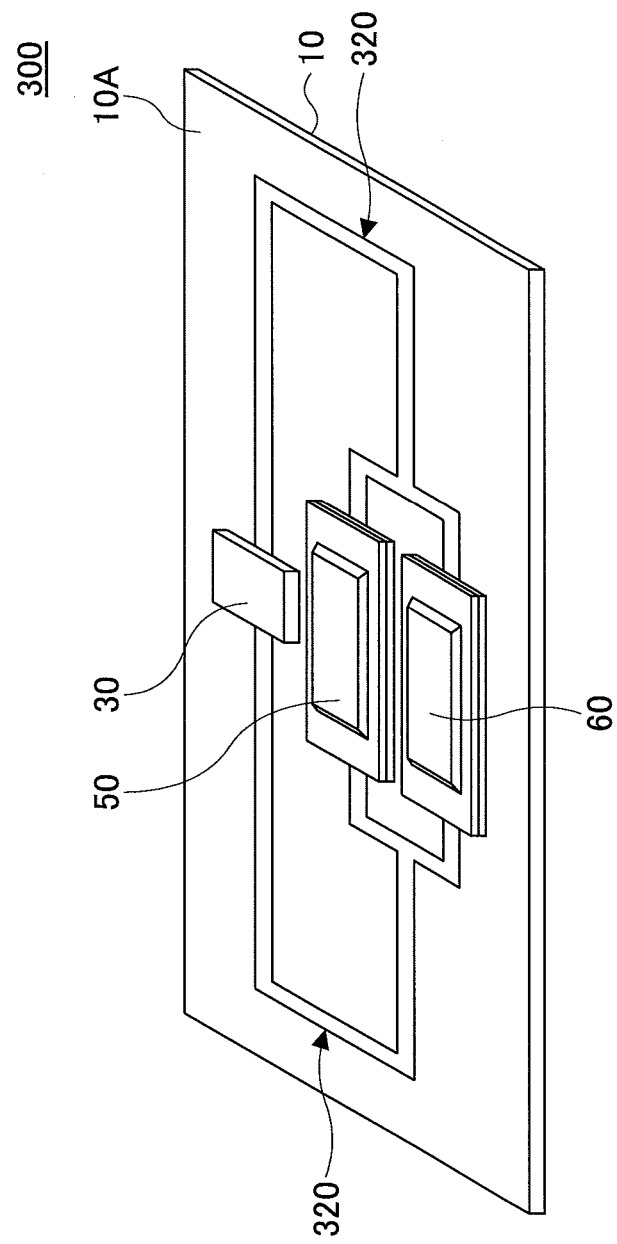
FIG. 23 is a perspective diagram illustrating an RFID tag 300 according to a third embodiment.
Figure 24:
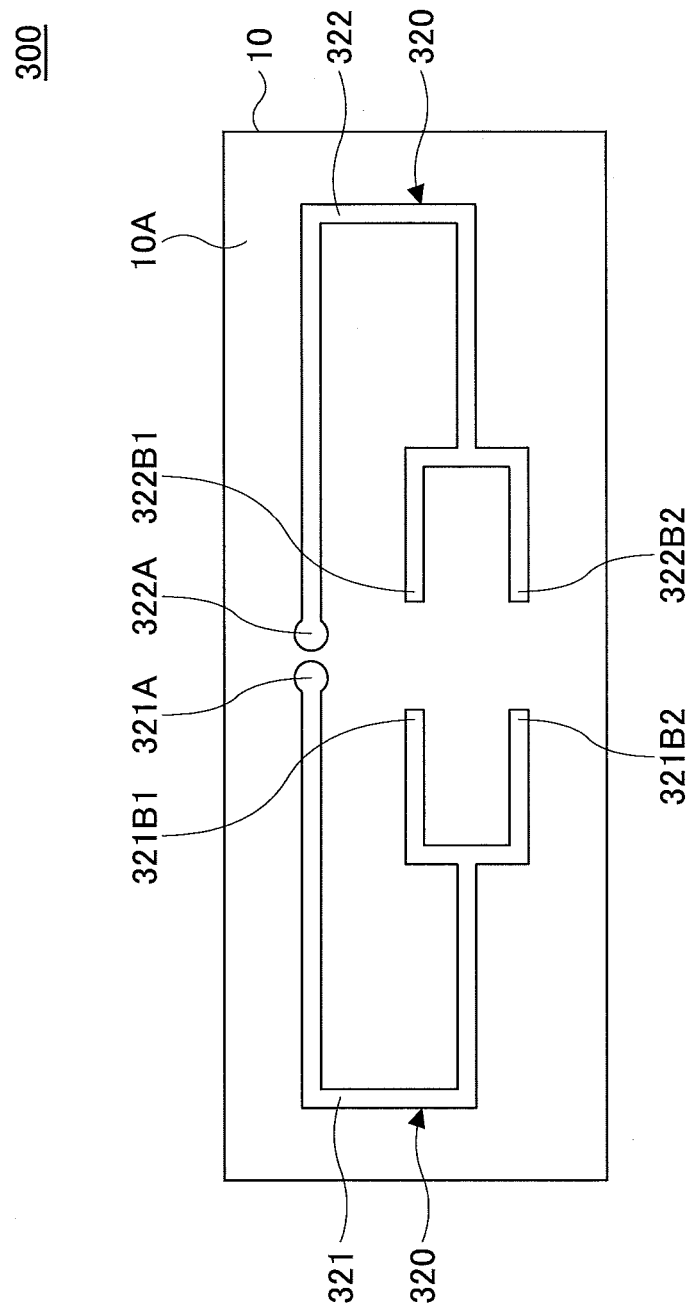
FIG. 24 is a diagram illustrating an antenna pattern of the RFID tag 300 according to the third embodiment.

FIG. 23 is a perspective diagram illustrating an RFID tag 300 according to a third embodiment. FIG. 24 is a diagram illustrating an antenna pattern of the RFID tag 300 according to the third embodiment.

The RFID tag 30 of the third embodiment is configured by connecting the fuse 60 in parallel with the fuse 50 of the RFID tag 200 of the second embodiment. Since other elements of the RFID tag 300 of the third embodiment are the same as or equivalent to those of the RFID tag 100 of the first embodiment or those of the RFID tag 200 of the second embodiment, elements of the RFID tag 300 of the third embodiment that are the same as or equivalent to those of the RFID tag 100 of the first embodiment or the RFID tag 200 of the second embodiment are designated by the same reference numerals, and a duplicated description is omitted.

The RFID tag 300 of the third embodiment includes the substrate 10, an antenna 320, the IC chip 30, the fuse 50, and the fuse 60.

The antenna 320 may, for example, be formed of silver paste, aluminum foil, or copper foil in a manner similar to the antenna 20 of the RFID tag of the first embodiment. In a case of the antenna 320 being formed of silver paste, silver paste may be screen-printed on the surface 10A of the substrate 10. In a case of the antenna 320 being formed of aluminum foil or copper foil, aluminum foil or copper foil formed on the surface 10A of the substrate 10 may be etched.

The antenna 320 is a loop-like antenna, and includes an antenna part 321 and an antenna part 322. The antenna parts 321 and 322 are each patterned in combinations of two U-shapes in a planar view.

The antenna part 321 includes a terminal 321A configured to be connected to the bump 31 of the IC chip 30 (see FIG. 3A). Further, the antenna part 321 includes a terminal 321B1 to which the land 53A of the fuse 50 is adhered with the electrically conductive adhesive 54A (see FIGS. 3A and 3B), and a terminal 321B2 to which the land 65A of the fuse 60 is adhered with the electrically conductive adhesive 66A (see FIGS. 5A and 5B). The terminals 321B1 and 321B2 are located at separate ends of the U-shape on an opposite side of the terminal 321A of the antenna part 321.

The antenna part 322 includes a terminal 322A configured to be connected to the bump 32 of the IC chip 30 (see FIG. 3A). Further, the antenna part 322 includes a terminal 322B1 to which the land 53B of the fuse 50 is adhered with the electrically conductive adhesive 54B (see FIGS. 3A and 3B), and a terminal 322B2 to which the land 65B of the fuse 60 is adhered with the electrically conductive adhesive 66B (see FIGS. 5A and 5B). The terminals 322B1 and 322B2 are located at separate ends of the U-shape on an opposite side of the terminal 322A of the antenna part 322.

The IC chip 30 is flip-chip mounted on the terminals 321A and 322A in a manner similar to the RFID tag 100 of the first embodiment.

The fuse 50 in the third embodiment is formed in a manner similar to the fuse 50 in the first embodiment as follows. The hole part 70A (see FIG. 8) is formed in the substrate 10 between the terminal 321B1 and the terminal 322B1, and the lands 53A and 53B are then adhered to the terminals 321B1 and 322B1 via the electrically conductive adhesives 54A and 54B (see FIGS. 3A and 3B).

The fuse 60 in the third embodiment is formed in a manner similar to the fuse 60 in the first embodiment as follows. The hole part 70B (see FIG. 8) is formed in the substrate 10 between the terminal 321B2 and the terminal 322B2, and the lands 66A and 66B are then adhered to the terminals 321B2 and 322B2 via the electrically conductive adhesives 66A and 66B (see FIGS. 5A and 5B).

In the RFID tag 300 of the third embodiment having such a configuration, the melting point (first temperature) of the soldering sheet 57 of the fuse 50 is set to a temperature higher than the melting point (second temperature) of the soldering bridge 64 and the soldering bump 68 of the fuse 60.

When the temperatures of the soldering bridge 64 and the soldering bump 68 (see FIGS. 5A and 5B) have reached the melting point (second temperature) or above to cause the soldering bridge 64 and the soldering bump 68 of the fuse 60 to melt, the fuse 60 has become electrically non-conductive. Hence, the identifier (ID) of the RFID tag 300 may become unreadable by the reader device.

Further, when the temperature of the soldering sheet 57 of the fuse 50 (see FIGS. 3A and 3B) has reached the melting point (first temperature) or above to cause the soldering sheet 57 of the fuse 50 to melt, the fuse 50 has become electrically conductive. Hence, the identifier (ID) of the RFID tag 300 may become readable by the reader device.

Accordingly, it is possible to determine that the temperature of the article has reached the second temperature when the RFID tag 300 is attached to the article subject to the temperature rise, and the RFID tag 300 has become unreadable by allowing the fuse 60 to be electrically non-conductive due to the temperature rise of the article.

Further, it is possible to determine that the temperature of the article has reached the first temperature when the RFID tag 300 becomes readable again by allowing the fuse 50 to be electrically conductive due to a further increase of the temperature of the article.

Hence, it is possible to identify articles having the temperatures reaching the first temperature by utilizing the RFID tags 300 of the third embodiment.

The above-described RFID tag 300 may be widely used for managing temperatures of articles in a production process of a semiconductor device with heating, a production process of resin molded articles with heating, a production process of food with heating, and the like.

According to the above-described embodiments, it is desirable to provide a fuse and an RFID tag capable of being read when a temperature rises.

The exemplified RFID tag and fuse of the first to the third embodiments are described above; however, these examples are not limited to those specifically disclosed as the first to the third embodiments. Various modifications or alterations may be made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An RFID tag, comprising:
   an antenna;
   a first IC chip connected to the antenna; and
   a first fuse inserted between the antenna and the first IC chip, or inserted in series with the antenna, wherein the first fuse becomes electrically conductive at a first temperature or above, and remains in an electrical conductive state after having become electrically conductive,
   wherein the first fuse includes
   a pair of first contact points, and
   a first solder disposed close to the first contact points in a state where the first solder has not melted, the first solder being configured to melt at the first temperature,
   wherein the first solder causes an interval between the first contact points to be electrically conductive at the first temperature or above, and remains in an electrical conductive state of the interval between the first contact points after the interval between the first contact points has become electrically conductive.

2. The RFID tag as claimed in claim 1, wherein the first fuse becomes electrically conductive when the first solder has melted at the first temperature.

3. The RFID tag as claimed in claim 1, wherein the first fuse further includes
   a first solvent disposed between the first contact points and the first solder in a state where the first solder has not melted.

4. The RFID tag as claimed in claim 1, wherein the first fuse further includes
   first spare solder that is disposed, after the first solder has melted, on surfaces of the first contact points to which the first solder is connected.

5. The RFID tag as claimed in claim 1, further comprising:
   a second IC chip; and
   a second fuse, wherein
   the antenna includes a first antenna part and a second antenna part that are connected in parallel with each other,
   the first IC chip is connected to the first antenna part, and
   the first fuse is inserted between the first antenna part and the first IC chip, or is inserted in series with the first antenna part, and wherein
   the second IC chip is connected to the second antenna part,
   the second fuse is inserted between the second antenna part and the second IC chip, or is inserted in series with the second antenna part, and
   the second fuse becomes electrically non-conductive at a second temperature or above, and remains in an electrical non-conductive state after having become electrically non-conductive.

6. The RFID tag as claimed in claim 5, wherein the second fuse includes
   a pair of second contact points, and
   second solder connecting the second contact points in a state where the second solder has not melted, the second solder being configured to melt at the second temperature, wherein when the second solder has melted at the second temperature to disconnect the second contact points, an interval between the pair of the second contact points becomes electrically non-conductive.

7. The RFID tag as claimed in claim 6, wherein the second fuse further includes
   a second solvent disposed close to the second solder in a state where the second solder has not melted.

8. The RFID tag as claimed in claim 6, wherein the second fuse further includes
   a soldering bump that is brought into contact with a central part of the second solder between the second contact points in a state where the second solder has not melted.

9. The RFID tag as claimed in claim 6, wherein the second fuse further includes
   second spare solder disposed close to the second solvent in a state where the second solder has not melted.

10. The RFID tag as claimed in claim 5, wherein
    the second temperature is equal to or less than the first temperature.

* * * * *